United States Patent [19]

Scrima et al.

[11] Patent Number: 5,457,143
[45] Date of Patent: * Oct. 10, 1995

[54] STABILIZATION OF POLYMERIC ORGANIC MATERIALS BY USING SYNERGISTIC MIXTURES COMPRISING STERICALLY HINDERED CYCLIC AMINES AND DERIVATIVES OF 3-PYRAZOLIDINONE OR 1,2,4-TRIAZOLIDINE-3,5-DIONE

[75] Inventors: Roberto Scrima; Giampiero Vessa, both of Bologna, Italy

[73] Assignee: Ciba-Geigy Corporation, Ardsley, N.Y.

[ * ] Notice: The portion of the term of this patent subsequent to May 11, 2010, has been disclaimed.

[21] Appl. No.: 218,994

[22] Filed: Mar. 28, 1994

Related U.S. Application Data

[63] Continuation of Ser. No. 891,530, Jun. 1, 1992, abandoned.

[30] Foreign Application Priority Data

Jun. 4, 1991 [IT] Italy .................................. MI91A1523

[51] Int. Cl.⁶ ................................................. C08K 5/3445
[52] U.S. Cl. ............................ 524/99; 524/100; 524/102; 524/103; 524/105; 524/106
[58] Field of Search ..................................... 524/105, 106, 524/102, 99, 100, 103; 548/370.4; 430/566, 218, 220, 959

[56] References Cited

U.S. PATENT DOCUMENTS

| | | | |
|---|---|---|---|
| 3,640,928 | 2/1972 | Murayama et al. | 260/23 |
| 3,684,765 | 8/1972 | Matsui et al. | 260/45.8 |
| 3,840,494 | 10/1974 | Murayama et al. | 260/45.8 |
| 3,904,581 | 9/1975 | Murayama et al. | 260/45.8 |
| 3,925,376 | 12/1975 | Chalmers et al. | 260/248 |
| 3,941,744 | 3/1976 | Murayama et al. | 260/45.8 |
| 3,975,462 | 8/1976 | Murayama et al. | 260/45.8 |
| 4,021,432 | 5/1977 | Holt et al. | 260/293.64 |
| 4,102,858 | 7/1978 | Minagawa et al. | 260/45.8 |
| 4,118,369 | 10/1978 | Minagawa et al. | 544/224 |
| 4,136,081 | 1/1979 | Minagawa et al. | 546/19 |
| 4,190,571 | 2/1980 | Lai et al. | 544/357 |
| 4,198,334 | 4/1980 | Rasberger et al. | 546/16 |
| 4,279,804 | 7/1981 | Cantatore et al. | 260/45.8 |
| 4,316,025 | 2/1982 | Cantatore et al. | 544/121 |
| 4,336,183 | 6/1982 | Nakahara et al. | 524/100 |
| 4,356,307 | 10/1982 | Kelkenberg et al. | 524/102 |
| 4,396,735 | 8/1983 | Minagawa et al. | 524/100 |
| 4,409,324 | 10/1983 | Ishikawa et al. | 430/566 |
| 4,480,092 | 10/1984 | Lai et al. | 524/100 |
| 4,695,599 | 9/1987 | Cantatore et al. | 524/103 |
| 4,725,634 | 2/1988 | Ishii et al. | 524/103 |
| 4,798,836 | 1/1989 | Minagaua et al. | 524/89 |
| 4,816,585 | 3/1989 | Raynor et al. | 524/100 |
| 5,079,285 | 1/1992 | Kluttz | 524/106 |
| 5,196,465 | 3/1993 | Scrima et al. | 524/106 |
| 5,210,118 | 5/1993 | Scrima | 524/106 |

FOREIGN PATENT DOCUMENTS

| | | |
|---|---|---|
| 0052073 | 5/1982 | European Pat. Off. . |
| 0027620 | 7/1985 | European Pat. Off. . |
| 0220034 | 4/1987 | European Pat. Off. . |
| 0219332 | 10/1988 | European Pat. Off. . |
| 0219331 | 10/1988 | European Pat. Off. . |
| 0162524 | 11/1988 | European Pat. Off. . |
| 0172413 | 1/1989 | European Pat. Off. . |
| 0141502 | 1/1989 | European Pat. Off. . |
| 0300160 | 1/1989 | European Pat. Off. . |
| 0243319 | 2/1989 | European Pat. Off. . |
| 0263561 | 7/1990 | European Pat. Off. . |
| 0390026 | 10/1990 | European Pat. Off. . |
| 0343717 | 12/1990 | European Pat. Off. . |
| 0127356 | 1/1991 | European Pat. Off. . |
| 2353538 | 8/1974 | Germany . |
| 2606026 | 8/1977 | Germany . |
| 2933732 | 3/1981 | Germany . |
| 3112795 | 10/1982 | Germany . |
| 3200433 | 7/1983 | Germany . |
| 54-95649 | 7/1979 | Japan . |
| 56-86165 | 7/1981 | Japan . |
| 2073734 | 10/1981 | United Kingdom . |

OTHER PUBLICATIONS

Rabek, J. F.: *Photostabilization of Polymers: Priciples and Applications,* Elsevier Applied Science (1990), 335–337.
Stephen W. Bigget et al: J. Polymer Science: Part A: Polymer Chemistry, vol. 27, 63–73 (1989).

*Primary Examiner*—Veronica P. Hoke
*Attorney, Agent, or Firm*—Luther A. R. Hall

[57] ABSTRACT

The present invention relates to synergistic mixtures for stabilising polymeric organic materials against light, heat and oxidation; said synergistic mixtures contain sterically hindered cyclic amines and particular derivatives of 3-pyrazolidinone or 1,2,4-triazolidine-3,5-dione. In addition, the present invention relates to some new derivatives of 3-pyrazolidinone or 1,2,4-triazolidine-3,5-dione.

14 Claims, No Drawings

STABILIZATION OF POLYMERIC ORGANIC MATERIALS BY USING SYNERGISTIC MIXTURES COMPRISING STERICALLY HINDERED CYCLIC AMINES AND DERIVATIVES OF 3-PYRAZOLIDINONE OR 1,2,4-TRIAZOLIDINE-3,5-DIONE

This is a continuation of application Ser. No. 07/891,530, filed on Jun. 1, 1992, now abandoned.

The present invention relates to synergistic mixtures for stabilising polymeric organic materials against light, heat and oxidation; said synergistic mixtures contain sterically hindered cyclic mines and particular derivatives of 3-pyrazolidinone or 1,2,4-triazolidine-3,5-dione. In addition, the present invention relates to some new derivatives of 3-pyrazolidinone or 1,2,4-triazolidine-3,5-dione.

Numerous patents have been published on the use, as light stabilisers for synthetic polymers, of derivatives of 2,2,6,6-tetramethylpiperidine and 3,3,5,5-tetramethylpiperazinone, in particular U.S. Pat. Nos. 3,640,928, 3,684,765, 3,840,494, 3,904,581, 3,925,376, 3,941,744, 3,975,462, 4,021,432, 4,102,858, 4,118,369, 4,136,081, 4,190,571, 4,198,334, 4,279,804, 4,316,025, 4,336,183, 4,356,307, 4,480,092, 4,695,599, 4,798,836 and 4,816,585, EP 27,620, 127,356, 141,502, 162,524, 172,413, 219,331, 219,332, 220, 034, 243,319, 263,561, 300,160 and 343,717, DE 2,353,538, 2,606,026 and 2,933,732, and JP 61-241,335.

In Japanese Patent 56-86,165 and GB Patent 2,073,734, the preparation and use of some derivatives of 4-hydroxymethyl-4-methyl-1-phenyl-3-pyrazolidinone in the field of photography has been described.

In Patent DE 3,112,795, some hydroxybenzyl derivatives of 1,2,4-triazolidine-3,5-dione, used for modifying melamine resins, urea resins and phenolic resins, have been reported.

In Patent DE 3,200,433, derivatives of hydroxyethyl-1,2,4-triazolidine-3,5-diones have been claimed as stabilisers against thermo-oxidative and actinic degradation of organic materials.

The use, as initiator of free-radical polymerisation, of some derivatives of 1,2,4-triazolidine-3,5-dione has been reported in Patent EP 390,026.

U.S. Pat. No. 4,396,735 claims the use, as light stabiliser for synthetic polymers, of synergistic mixtures consisting of 2,2,6,6-tetramethylpiperidine and cyclic hydrazides.

Japanese Patent 54-95,649 reports the use, as light stabilisers for synthetic polymers, of synergistic mixtures consisting of derivatives of 2,2,6,6-tetramethylpiperidine and heterocyclic compounds containing —NH—N=C<,

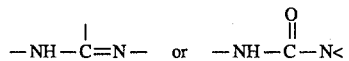

groups.

The present invention relates to a synergistic mixture comprising:

A) one or more compounds containing groups of the formulae (Ia)–(Ic)

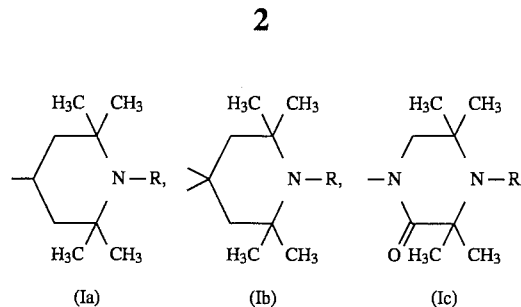

in which R is hydrogen, $C_1$–$C_4$alkyl, O, OH, $C_1$–$C_{12}$alkoxy, $C_5$–$C_8$cycloalkoxy, $C_3$–$C_6$alkenyl, $C_7$–$C_9$phenylalkyl which is unsubstituted or mono-, di- or tri-substituted on the phenyl by $C_1$–$C_4$alkyl; or $C_1$–$C_8$acyl, preferably hydrogen or methyl;

B) one or more derivatives of 3-pyrazolidinone or of 1,2,4-triazolidine-3,5-dione substituted in the 1-position.

In particular, the compounds (A) containing groups of the formulae (Ia)–(Ic), which can be used according to the present invention, are compounds of the formulae (IIa)–(IId)

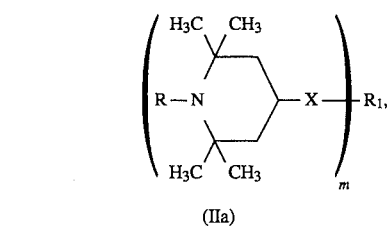

(IIa)

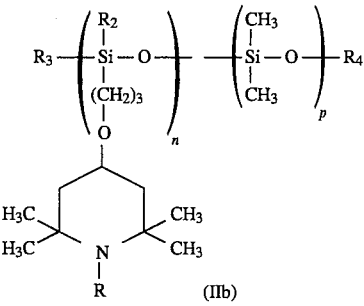

(IIb)

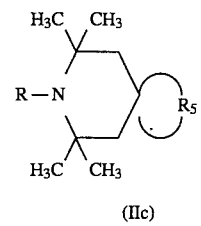

(IIc)

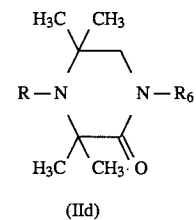

(IId)

in which X is —O— or

where $R_7$ is hydrogen, $C_1$–$C_{18}$alkyl, $C_5$–$C_{12}$cycloalkyl which is unsubstituted or mono-, di- or tri-substituted by $C_1$–$C_4$alkyl; $C_7$–$C_9$phenylalkyl which is unsubstituted or mono-, di- or tri-substituted on the phenyl by $C_1$–$C_4$alkyl; or a group of the formula (III)

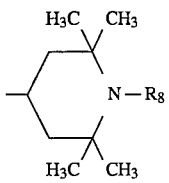 (III)

in which $R_8$ is as defined for R, m is 1, 2, 3 or 4 and, when m is 1, $R_1$ is aliphatic, cycloaliphatic, aromatic, arylaliphatic or heterocyclic acyl containing not more than 22 carbon atoms or, when X is —O—, $R_1$ is also a group of the formula (IV)

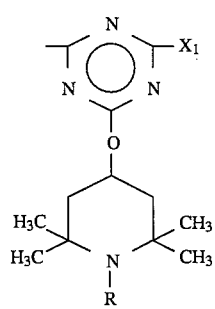 (IV)

in which $X_1$ is a group —$OR_9$ or

where $R_9$, $R_{10}$ and $R_{11}$ which may be identical or different are as defined above for $R_7$ or $C_3$–$C_{18}$alkenyl, or the group

is a 5- to 7-membered heterocyclic group or $X_1$ is also a group of the formula (V)

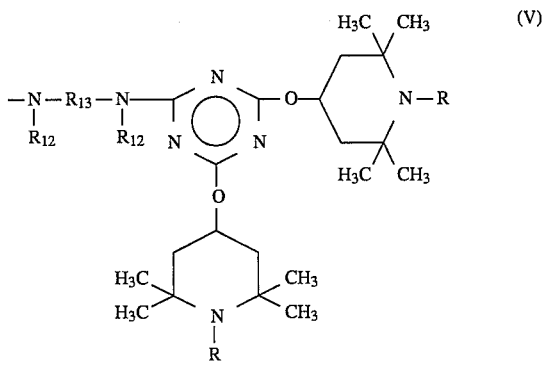 (V)

where $R_{12}$ is $C_1$–$C_{18}$alkyl, $C_5$–$C_{12}$cycloalkyl which is unsubstituted or mono-, di- or tri-substituted by $C_1$–$C_4$alkyl; $C_7$–$C_9$phenylalkyl which is unsubstituted or mono-, di- or tri-substituted on the phenyl by $C_1$–$C_4$alkyl; or a group of the formula (III) and $R_{13}$ is $C_2$–$C_{12}$alkylene, cyclohexylene, cyclohexylenedimethylene, methylenedicyclohexylene, xylylene or $C_4$–$C_{12}$alkylene interrupted by 1, 2 or 3 oxygen atoms or by 1, 2 or 3

groups where $R_{14}$ is a group of the formula (VI)

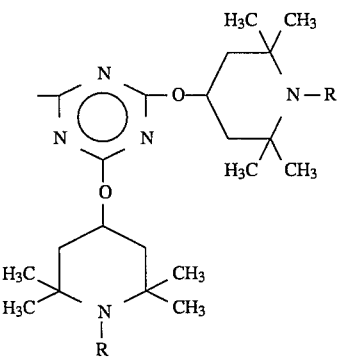 (VI)

or the group

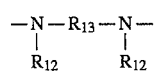

is a group of the formula (VII)

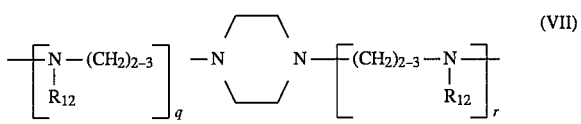 (VII)

where $R_{12}$ is as defined above and q and r which can be identical or different are zero or 1, or the group —X—$R_1$ is also one of the groups of the formulae (VIIIa)–(VIIIe)

(VIIIa)  (VIIIb)

(VIIIc)

(VIIId)

(VIIIe)

in which $R_{15}$ is $C_1$–$C_{18}$alkyl or $C_3$–$C_{18}$alkenyl, $R_{16}$ is as defined above for $R_{12}$ or phenyl or a group of the formula (IX)

(IX)

where $R_{21}$ is $C_2$–$C_{12}$alkylene, cyclohexylene, cyclohexylenedimethylene, methylenedicyclohexylene, a group

, phenylene, methylphenylene, xylylene, methylenediphenylene or oxydiphenylene, $R_{17}$ is $C_1$–$C_{12}$alkylidene, benzylidene, carbonyl, oxalyl, malonyl, ethylene or a group —CH$_2$CO—, $R_{18}$ is $C_1$–$C_8$acyl or ($C_1$–$C_8$alkoxy)carbonyl, $R_{19}$ is $C_2$–$C_{12}$alkylene, cyclohexylene, cyclohexylenedimethylene, methylenedicyclohexylene, xylylene or $C_4$–$C_{12}$alkylene interrupted by 1, 2 or 3 oxygen atoms or by 1, 2 or 3 groups with $R_{18}$ being as defined above, and $R_{20}$ is one of the groups and, when m is 2, $R_1$ is $C_2$–$C_{12}$alkylene, $C_4$–$C_{12}$alkylene interrupted by 1, 2 or 3 oxygen atoms; cyclohexylene, cyclohexylenedimethylene, methylenedicyclohexylene, xylylene, a group $$-CH_2CO- \text{ or } -\underset{\underset{CH_3}{|}}{\overset{\overset{CH_3}{|}}{C}}-CO-$$

or aliphatic, cycloaliphatic, aromatic, arylaliphatic or heterocyclic diacyl containing not more than 22 carbon atoms, and, when m is 3, $R_1$ is aliphatic, aromatic or heterocyclic triacyl having not more than 18 carbon atoms, and, when m is 4, $R_1$ is aliphatic or aromatic tetraacyl having not more than 18 carbon atoms; $R_2$ is $C_1$–$C_4$alkyl, $C_1$–$C_4$alkoxy or OH, n is a number from 1 to 50, p is a number from 0 to 30, $R_3$ is OH, $C_1$–$C_4$alkoxy or a group (CH$_3$)$_3$SiO—, $R_4$ is hydrogen, $C_1$–$C_4$ alkyl or a group (CH$_3$)$_3$Si—, and, when n+p is a number from 3 to 10, $R_3$ and $R_4$ also form a direct bond, $R_5$ is one of the groups of the formulae (Xa)–(Xc)

$$-CO-N-R_{22} \quad \text{(Xa)}$$
$$-O-\underset{\underset{R_{24}}{|}}{\overset{\overset{}{|}}{C}}-R_{23},$$

$$-CO-N-R_{25} \quad \text{(Xb)}$$
$$-N-CO$$
$$\underset{R_{26}}{|}$$

(Xc)

in which $R_{22}$, $R_{25}$ and $R_{26}$ which can be identical or different are as defined above for $R_7$; $R_{23}$ and $R_{24}$ which can be identical or different are $C_1$–$C_{18}$alkyl or $R_{23}$ and $R_{24}$, together with the carbon atom to which they are bound, are a $C_5$–$C_{12}$cycloalkylidene group, and $R_{27}$ is one of the groups of the formulae (XIa)–(XIf)

(XIa)

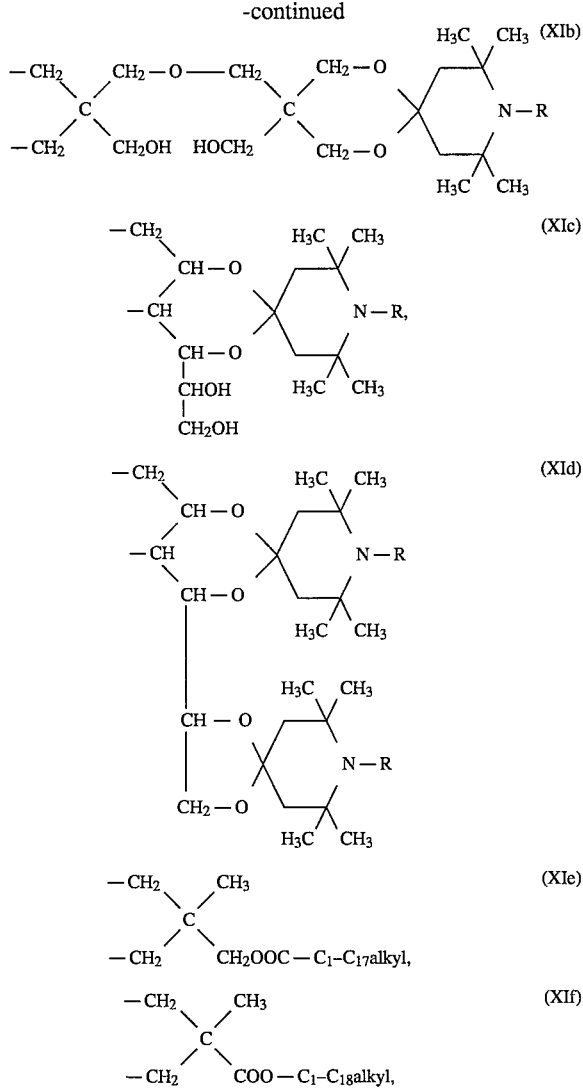

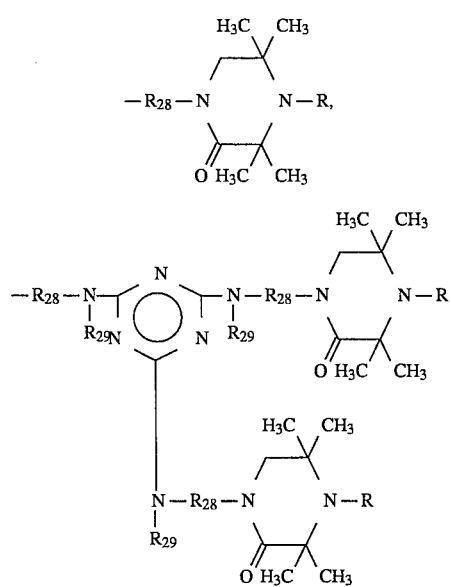

$R_6$ is a group of the formula (XIIa) or (XIIb)

in which $R_{28}$ is $C_2-C_{12}$alkylene and $R_{29}$ is as defined above for $R_7$;

the compounds (B) which can be used according to the present invention are the compounds of the formulae (XIIIa)–(XIIIc)

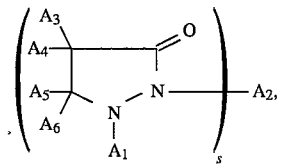

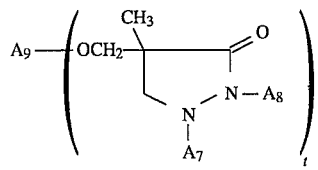

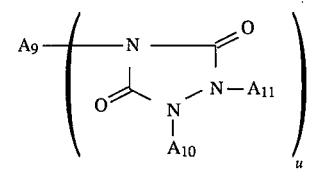

in which $A_1$ is $C_1-C_{18}$alkyl, $C_5-C_{12}$cycloalkyl which is unsubstituted or mono-, di- or tri-substituted by $C_1-C_4$alkyl; phenyl which is unsubstituted or mono-, di- or tri-substituted by $C_1-C_4$alkyl or $C_1-C_4$alkoxy and/or monosubstituted by an OH group; phenylalkyl which is unsubstituted or mono-, di- or tri-substituted on the phenyl by $C_1-C_4$alkyl and/or monosubstituted by an OH group; a group $-A_{13}-COOA_{14}$ where $A_{13}$ is $C_1-C_6$alkylene and $A_{14}$ is $C_1-C_{18}$alkyl, $C_5-C_{12}$cycloalkyl which is unsubstituted or mono-, di- or tri-substituted by $C_1C_4$alkyl; $C_3-C_{18}$alkenyl or $C_7-C_9$phenylalkyl which is unsubstituted or mono-, di- or tri-substituted on the phenyl by $C_1-C_4$alkyl; $A_3$, $A_4$, $A_5$ and $A_6$ which can be identical or different are hydrogen, $C_1-C_4$alkyl or phenyl, and s is 1 or 2, and, when s is 1, $A_2$ is hydrogen, $C_1-C_{18}$alkyl, $C_3-C_6$alkenyl or $C_7-C_9$phenylalkyl which is unsubstituted or mono-, di- or tri-substituted on the phenyl by $C_1-C_4$alkyl; or a group $-A_{13}-COOA_{14}$ as defined above, and, when $A_2$ is hydrogen, $A_1$ can also be a group of the formula (XIV)

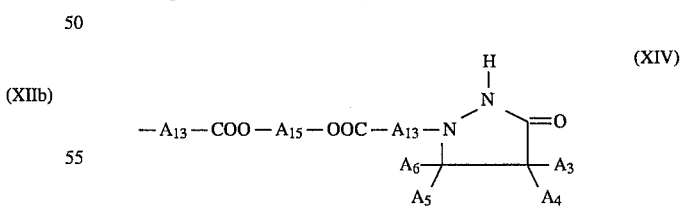

where $A_3$, $A_4$, $A_5$, $A_6$ and $A_{13}$ are as defined above and $A_{15}$ is $C_2-C_{12}$alkylene, $C_4-C_{12}$alkylene interrupted by 1, 2 or 3 oxygen atoms; cyclohexylene, cyclohexylenedimethylene or isopropylidenedicyclohexylene, and, when s is 2, $A_2$ is $C_2-C_{12}$alkylene or xylylene, $A_7$ is phenyl which is unsubstituted or mono-, di- or tri-substituted by $C_1-C_4$alkyl or $C_1-C_4$alkoxy and/or monosubstituted by an OH group; $A_8$ is hydrogen, $C_1-C_{18}$alkyl, $C_3-C_6$alkenyl, $C_7-C_9$phenylalkyl which is unsubstituted or mono-, di- or tri-substituted on the phenyl by $C_1-C_4$alkyl; or a group $-A_{13}-COOA_{14}$ as defined above, t is 1, 2, 3 or 4, and, when t is 1, $A_9$ is aliphatic, cycloaliphatic, aromatic, arylaliphatic or heterocyclic acyl containing not more than 22 carbon atoms, or one of the groups of the formulae (XVa)–(XVc)

  (XVa)

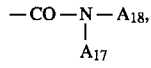  (XVb)

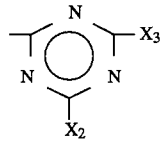  (XVc)

in which $A_{16}$ is as defined above for $A_{14}$; $A_{17}$ and $A_{18}$ which can be identical or different are as defined above for $A_{14}$ or are hydrogen or phenyl or the group

is a 5- to 7-membered heterocyclic group, $X_2$ and $X_3$ which can be identical or different are a group —O—$A_{19}$ or

where $A_{19}$, $A_{20}$ and $A_{21}$ which can be identical or different are as defined above for $A_{17}$ and $A_{18}$, and, when t is 2, $A_9$ is carbonyl, aliphatic, cycloaliphatic, aromatic or heterocyclic diacyl containing not more than 22 carbon atoms, or a group of the formulae (XVIa)–(XVIc)

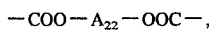  (XVIa)

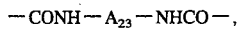  (XVIb)

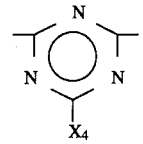  (XVIc)

in which $A_{22}$ is $C_2$–$C_{12}$alkylene, $C_4$–$C_{12}$alkylene interrupted by 1, 2 or 3 oxygen atoms; cyclohexylene, cyclohexylenedimethylene, isopropylidenedicyclohexylene, phenylene, xylylene or isopropylidenediphenylene, $A_{23}$ is as defined above for $R_{21}$ and $X_4$ is as defined above for $X_2$ and $X_3$, and, when t is 3, $A_9$ is aliphatic, aromatic or heterocyclic triacyl containing not more than 18 carbon atoms, or 1,3,5-triazine-2,4,6-triyl, and, when t is 4, $A_9$ is aliphatic or aromatic tetraacyl containing not more than 18 carbon atoms, $A_{10}$ is $C_1$–$C_{18}$alkyl, $C_5$–$C_{12}$cycloalkyl which is unsubstituted or mono-, di- or tri-substituted by $C_1$–$C_4$alkyl; $C_3$–$C_{18}$alkenyl, phenyl which is unsubstituted or mono-, di- or tri-substituted by $C_1$–$C_4$alkyl or $C_1$–$C_4$alkoxy and/or monosubstituted by an OH group; $C_7$–$C_9$phenylalkyl which is unsubstituted or mono-, di- or tri-substituted on the phenyl by $C_1$–$C_4$alkyl and/or monosubstituted by an OH group; $A_{11}$ is as defined above for $A_8$, u is 1, 2 or 3, and, when u is 1, $A_{12}$ is as defined for $A_{10}$ or is a group

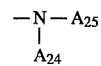

where $A_{24}$ and $A_{25}$ which can be identical or different are as defined for $A_{10}$ or $A_{24}$ is also hydrogen or aliphatic, cycloaliphatic or aromatic, arylaliphatic or heterocyclic acyl containing not more than 22 carbon atoms or a group —$COOA_{26}$ with $A_{26}$ as defined above for $A_{14}$, and, when u is 2, $A_{12}$ is as defined above for $R_{21}$ or is a group of the formula (XVIIa) or (XVIIb)

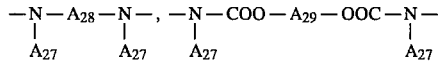

(XVIIa)         (XVIIb)

in which $A_{27}$ is as defined for $A_{10}$, $A_{28}$ is aliphatic, cycloaliphatic, aromatic or heterocyclic diacyl containing not more than 22 carbon atoms and $A_{29}$ is as defined above for $A_{15}$, and, when u is 3, $A_{12}$ is a group of the formula (XVIII)

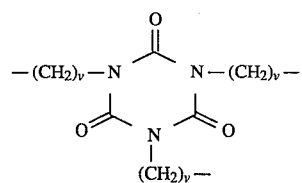  (XVIII)

in which v is an integer from 2 to 6.

Examples of alkyl having not more than 18 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, pentadecyl, hexadecyl, heptadecyl and octadecyl.

Examples of alkoxy having not more than 18 carbon atoms are methoxy, ethoxy, propoxy, isopropoxy, butoxy, isobutoxy, pentoxy, isopentoxy, hexoxy, heptoxy, octoxy, nonoxy, decyloxy, dodecyloxy, tetradecyloxy, hexadecyloxy and octadecyloxy.

Examples of $C_5$–$C_{12}$cycloalkyl which is unsubstituted or mono-, di- or tri-substituted by $C_1$–$C_4$alkyl are cyclopentyl, methylcyclopentyl, dimethylcyclopentyl, cyclohexyl, methylcyclohexyl, dimethylcyclohexyl, trimethylcyclohexyl, t-butylcyclohexyl, cyclooctyl, cyclodecyl and cyclododecyl; unsubstituted or $C_1$–$C_4$alkyl-substituted cyclohexyl is preferred.

Representative examples of $C_5$–$C_8$cycloalkoxy R and $R_8$ are cyclopentoxy, cyclohexoxy, cycloheptoxy and cyclooctoxy. Cyclopentoxy and cyclohexoxy are preferred.

Examples of alkenyl having not more than 18 carbon atoms are allyl, 2-methylallyl, butenyl, hexenyl, undecenyl and octadecenyl. The carbon atom in the 1-position is preferably saturated.

Examples of R and $R_{18}$ as $C_1$–$C_8$acyl are formyl, acetyl, propionyl, butyryl, pentanoyl, hexanoyl, heptanoyl, octanoyl, benzoyl, acryloyl and crotonyl. $C_1$–$C_8$alkanoyl, $C_3$–$C_8$alkenoyl and benzoyl are preferred. Acetyl is particularly preferred.

Examples of ($C_1$–$C_8$alkoxy)carbonyl are methoxycarbonyl, ethoxycarbonyl, propoxycarbonyl, butoxycarbonyl, hexoxycarbonyl, heptoxycarbonyl and octoxycarbonyl.

Examples of $C_7$–$C_9$phenylalkyl which is unsubstituted or substituted on the phenyl are benzyl, methylbenzyl, dimethylbenzyl, trimethylbenzyl, t-butylbenzyl, 2-phenylethyl and 3,5-di-t-butyl-4-hydroxybenzyl.

Representative examples of substituted phenyl are methylphenyl, dimethylphenyl, trimethylphenyl, 3,5-di-t-butyl-4-methylphenyl, methoxyphenyl, ethoxyphenyl, dimethoxyphenyl, trimethoxyphenyl, hydroxyphenyl and 3,5-di-t-butyl-4-hydroxyphenyl.

Representative examples of 5- to 7-membered heterocyclic groups

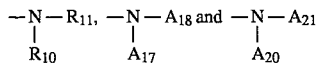

are 1-pyrrolidyl, 1-piperidyl, 4-morpholinyl, 4-methyl-1-piperazinyl and 1-hexahydroazepinyl. 4-Morpholinyl is preferred.

Examples of aliphatic, cycloaliphatic, aromatic, arylaliphatic or heterocyclic acyl having not more than 22 carbon atoms are those derived from formic, acetic, propionic, butyric, isobutyric, valeric, pivalic, hexanoic, heptanoic, octanoic, 2-ethylhexanoic, nonanoic, decanoic, undecanoic, dodecanoic, tetradecanoic, hexadecanoic, octadecanoic, eicosanoic, docosanoic, acrylic, methacrylic, crotonic, undecenoic, octadecenoic, cyclohexanecarboxylic, cyclohexaneacetic, benzoic, methylbenzoic, t-butylbenzoic, methoxybenzoic, hydroxybenzoic, 3,5-di-t-butyl-4-hydroxybenzoic, phenylacetic, phenoxyacetic, 3-phenylpropionic, 3-(3,5-di-t-butyl-4-hydroxyphenyl)propionic, furoic, tetrahydrofurancarboxylic, nicotinic, isonicotinic, pyroglutamic or 3-(2,2,6,6-tetramethyl-4-piperidylamino)crotonic acids. $C_1$–$C_{22}$alkanoyl, $C_3$–$C_{22}$alkenoyl and unsubstituted or substituted benzoyl are preferred.

Examples of alkylene having not more than 12 carbon atoms are methylene, ethylene, propylene, trimethylene, tetramethylene, pentamethylene, 2,2-dimethyltrimethylene, hexamethylene, heptamethylene, octamethylene, trimethylhexamethylene, decamethylene and dodecamethylene.

Examples of $C_4$–$C_{12}$alkylene interrupted by 1, 2 or 3 oxygen atoms are 3-oxapentane-1,5-diyl, 4-oxaheptane-1,7-diyl, 3,6-dioxaoctane-1,8-diyl, 4,7-dioxadecane-1,10-diyl, 4,9-dioxadodecane-1,12-diyl, 3,6,9-trioxaundecane-1,11-diyl and 4,7,10-trioxatridecane-1,13-diyl.

Representative examples of $C_4$–$C_{12}$alkylene $R_{13}$ interrupted by 1, 2 or 3 >N—$R_{14}$ groups are the groups

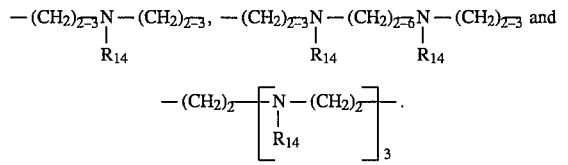

Representative examples of $C_1$–$C_{12}$alkylidene $R_{17}$ are methylene, ethylidene, propylidene, butylidene, isobutylidene, pentylidene, hexylidene, heptylidene, octylidene, 2-ethylhexylidene, decylidene and dodecylidene.

Examples of aliphatic, cycloaliphatic, aromatic, arylaliphatic or heterocyclic diacyl having not more than 22 carbon atoms are those derived from oxalic, malonic, succinic, methylmalonic, allylmalonic, glutaric, ethylmalonic, adipic, pimelic, diethylmalonic, suberic, azeleic, sebacic, 1,12-dodecanedoic, oxydiacetic, iminodiacetic, methyliminodiacetic, maleic, fumaric, itaconic, citraconic, cyclohexanedicarboxylic, cyclohexenedicarboxylic, bicycloheptenedicarboxylic, phthalic, isophthalic, terephthalic, phenylmalonic, benzylidenemalonic, benzylmalonic, butyl-3,5-di-t-butyl-4-hydroxybenzylmalonic, furandicarboxylic, pyridinedicarboxylic, 1,4-dioxaspiro[4.5]decane-2,3-dicarboxylic, 1,5-dioxaspiro[5.5]undecane-3,3-dicarboxylic, 7,7,9,9-tetramethyl-1,4-dioxa-8-azaspiro[4.5] decane-2,3-dicarboxylic, 8,8,10,10-tetramethyl-1,5-dioxa-9-azaspiro[5.5] undecane-3,3 -dicarboxylic and N-(2,2,6,6-tetramethyl-4-piperidyl)iminodiacetic acids. $C_2$–$C_{22}$alkanedioyl and $C_4$–$C_{22}$alkendioyl are preferred.

Representative examples of $C_5$–$C_{12}$cycloalkylidene $R_{23}$ and $R_{24}$, together with the carbon atom to which they are linked, are cyclopentylidene, cyclohexylidene, methylcyclohexylidene, dimethylcyclohexylidene, trimethylcyclohexylidene, t-butylcyclohexylidene, cyclooctylidene, cyclodecylidene and cyclododecylidene.

Examples of aliphatic, aromatic or heterocyclic triacyl having not more than 18 carbon atoms are those derived from methanetricarboxylic, 1,1,2-ethanetricarboxylic, 1,2,3-propanetricarboxylic, 1,2,3-butanetricarboxylic, citric, nitrilotriacetic and benzenetricarboxylic acids or the acid

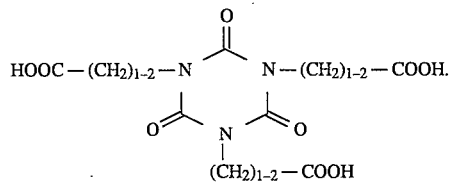

$C_4$–$C_{18}$alkanetrioyl is preferred.

Examples of aliphatic or aromatic tetraacyl having not more than 18 carbon atoms are those derived from 1,1,2,2-ethanetetracarboxylic, 1,1,3,3-propanetetracarboxylic, 1,2,2,3-propanetetracarboxylic, 1,2,3,4-butanetetracarboxylic, ethylenediaminetetraacetic or pyromellitic acids. $C_6$–$C_{18}$alkanetetraoyl is preferred.

Preferred compounds which can be used according to the present invention are:

A) compounds of the formula (IIa)–(IId) in which R is hydrogen, methyl, OH, $C_6$–$C_9$alkoxy, $C_5$–$C_7$cycloalkoxy, allyl, benzyl or acetyl, X is —O— or

where $R_7$ is hydrogen, $C_1$–$C_{12}$alkyl, $C_5$–$C_8$cycloalkyl which is unsubstituted or mono-, di- or tri-substituted by $C_1$–$C_4$alkyl; benzyl which is unsubstituted or mono-, di- or tri-substituted on the phenyl by $C_1$–$C_4$alkyl; or a group of the formula (III) in which $R_8$ is as defined for R, m is 1, 2, 3 or 4 and, when m is 1, $R_1$ is aliphatic $C_2$–$C_{22}$acyl, cycloaliphatic $C_7$–$C_{15}$acyl, aromatic $C_7C_{15}$acyl, arylaliphatic $C_8$–$C_{20}$acyl or heterocyclic $C_5$–$C_{15}$acyl or, when X is —O—, $R_1$ is also a group of the formula (IV) in which $X_1$ is a group —$OR_9$ or

where $R_9$, $R_{10}$ and $R_{11}$ which can be identical or different are as defined above for $R_7$ or $C_3$–$C_{12}$alkenyl, or the group

is 1-pyrrolidyl, 1-piperidyl, 4-morpholinyl or 1-hexahydroazepinyl, or $X_1$ is also a group of the formula (V) where $R_{12}$ is $C_1$–$C_{12}$alkyl, $C_5$–$C_8$cycloalkyl which is unsubstituted or mono-, di- or tri-substituted by $C_1$–$C_4$alkyl; benzyl which is unsubstituted or mono-, di- or tri-substituted on the phenyl by $C_1$–$C_4$alkyl; or a group of the formula (III), and $R_{13}$ is $C_2$–$C_{10}$alkylene, cyclohexylenedimethylene, methylenedicyclohexylene, xylylene or $C_4$–$C_{10}$alkylene interrupted by 1, 2 or 3 oxygen atoms or by 1, 2 or 3

groups where $R_{14}$ is a group of the formula (VI) or the group

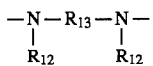

is a group of the formula (VII) in which q and r which can be identical or different are zero or 1, or the group —$X$—$R_1$ is also one of the groups of the formulae (VIIIa)–(VIIIe) in which $R_{15}$ is $C_1$–$C_{18}$alkyl or $C_3$–$C_{18}$alkenyl, $R_{16}$ is as defined above for $R_{12}$ or a group of the formula (IX) where $R_{21}$ is $C_2$–$C_{10}$alkylene, cyclohexylenedimethylene, methylenedicyclohexylene, the group

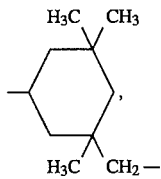

phenylene, methylphenylene, methylenediphenylene or oxydiphenylene, $R_{17}$ is $C_1$–$C_8$alkylidene, carbonyl, oxalyl, malonyl, ethylene or a group —$CH_2CO$—, $R_{18}$ is $C_1$–$C_6$acyl or ($C_1$–$C_6$alkoxy)carbonyl, $R_{19}$ is $C_2$–$C_{10}$alkylene, cyclohexylenedimethylene, methylenedicyclohexylene, xylylene or $C_4$–$C_{10}$alkylene interrupted by 1, 2 or 3 oxygen atoms or by 1, 2 or 3

groups with $R_{18}$ being as defined above, and $R_{20}$ is a group

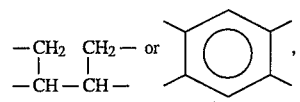

and, when m is 2, $R_1$ is $C_2$–$C_{10}$alkylene, $C_4$–$C_{10}$alkylene interrupted by 1, 2 or 3 oxygen atoms; cyclohexylenedimethylene, methylenedicyclohexylene, xylylene, a group —$CH_2CO$— or

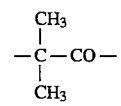

or aliphatic $C_2$–$C_{14}$diacyl, cycloaliphatic $C_8$–$C_{14}$diacyl, aromatic $C_8$–$C_{14}$diacyl, arylaliphatic $C_9$–$C_{22}$diacyl or heterocyclic $C_6$–$C_{18}$diacyl, and, when m is 3, $R_1$ is aliphatic $C_4$–$C_{15}$triacyl, aromatic $C_9$–$C_{12}$triacyl or heterocyclic $C_7$–$C_{12}$triacyl, and, when m is 4, $R_1$ is aliphatic $C_6$–$C_{12}$tetraacyl or aromatic $C_{10}$–$C_{12}$tetraacyl; $R_2$ is $C_1$–$C_3$alkyl, $C_1$–$C_3$alkoxy or OH, n is a number from 5 to 50, p is a number from zero to 25, $R_3$ is OH, $C_1$–$C_3$alkoxy or a group $(CH_3)_3SiO$—, $R_4$ is hydrogen, $C_1$–$C_3$alkyl or a group $(CH_3)_3Si$—, and, when n+p is a number from 3 to 10, $R_3$ and $R_4$ also form a direct bond, $R_5$ is one of the groups of the formulae (Xa)–(Xc) in which $R_{22}$, $R_{25}$ and $R_{26}$ which can be identical or different are hydrogen, $C_1$–$C_{18}$alkyl, $C_5$–$C_8$cycloalkyl which is unsubstituted or mono-, di- or tri-substituted by $C_1$–$C_4$alkyl; or benzyl which is unsubstituted or mono-, di- or tri-substituted on the phenyl by $C_1$–$C_4$alkyl; $R_{23}$ and $R_{24}$ which can be identical or different are $C_1$–$C_{12}$alkyl or $R_{23}$ and $R_{24}$, together with the carbon atom to which they are linked, are a $C_6$–$C_{12}$cycloalkylidene group, and $R_{27}$ is one of the groups of the formulae (XIa)–(XIf), and $R_6$ is a group of the formula (XIIa) or (XIIb) in which $R_{28}$ is $C_2$–$C_{10}$alkylene and $R_{29}$ is as defined above for $R_7$;

B) compounds of the formulae (XIIIa)–(XIIIc) in which $A_1$ is $C_1$–$C_{12}$alkyl, $C_5$–$C_8$cycloalkyl which is unsubstituted or mono-, di- or tri-substituted by $C_1$–$C_4$alkyl; phenyl which is unsubstituted or mono-, di- or tri-substituted by $C_1$–$C_4$alkyl or $C_1$–$C_4$alkoxy; benzyl which is unsubstituted or mono-, di- or tri-substituted on the phenyl by $C_1$–$C_4$alkyl; or a group —$A_{13}$—$COOA_{14}$ where $A_{13}$ is $C_1$–$C_5$alkylene and $A_{14}$ is $C_1$–$C_{18}$alkyl, $C_5$–$C_8$cycloalkyl which is unsubstituted or mono-, di- or tri-substituted by $C_1$–$C_4$alkyl; allyl, undecenyl, oleyl or benzyl which is unsubstituted or mono-, di- or tri-substituted on the phenyl by $C_1$–$C_4$alkyl; $A_3$, $A_4$, $A_5$ and $A_6$ which can be identical or different are hydrogen or methyl, s is 1 or 2, and, when s is 1, $A_2$ is hydrogen, $C_1$–$C_{18}$alkyl, allyl, benzyl which is unsubstituted or mono-, di- or tri-substituted on the phenyl by $C_1$–$C_4$alkyl; or a group —$A_{13}$—$COOA_{14}$ as defined above, and, when $A_2$ is hydrogen, $A_1$ can also be a group of the formula (XIV) where $A_{15}$ is $C_2$–$C_{10}$alkylene, $C_4$–$C_{10}$alkylene interrupted by 1, 2 or 3 oxygen atoms; cyclohexylenedimethylene or isopropylidenedicyclohexylene, and, when s is 2, $A_2$ is $C_2$–$C_{10}$alkylene or xylylene, $A_7$ is phenyl which is unsubstituted or mono-, di- or tri-substituted by $C_1$–$C_4$alkyl or $C_1$–$C_4$alkoxy; $A_8$ is hydrogen, $C_1$–$C_{12}$alkyl, allyl, benzyl which is unsubstituted or mono-, di- or tri-substituted on the phenyl by $C_1$-$C_4$alkyl; or a group —$A_{13}COOA_{14}$ as defined above, t is 1, 2, 3 or 4, and, when t is 1, $A_9$ is aliphatic $C_2$-$C_{22}$acyl, cycloaliphatic $C_7$-$C_{15}$acyl, aromatic $C_7$-$C_{15}$acyl or arylaliphatic $C_8$-$C_{20}$acyl or one of the groups of the formulae (XVa)–(XVc) in which $A_{16}$ is as defined above for $A_{14}$, and $A_{17}$ and $A_{18}$ which can be identical or different are as defined above for $A_{14}$ or are hydrogen or phenyl, or the group

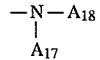

is 1-pyrrolidyl, 1-piperidyl, 4-morpholinyl or 1-hexahydroazepinyl, $X_2$ and $X_3$ which can be identical or different are a group —$OA_{19}$ or

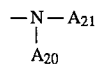

where $A_{19}$, $A_{20}$ and $A_{21}$ which can be identical or different are as defined above for $A_{17}$ and $A_{18}$, and, when t is 2, $A_9$ is aliphatic $C_2$-$C_{14}$diacyl, cycloaliphatic $C_8$-$C_{14}$diacyl, aromatic $C_8$-$C_{14}$diacyl or arylaliphatic $C_9$-$C_{22}$diacyl or a group of the formulae (XVIa)–(XVIc) in which $A_{22}$ is $C_2$-$C_{10}$alkylene, $C_4$-$C_{10}$alkylene interrupted by 1, 2 or 3 oxygen atoms; cyclohexylenedimethylene, isopropylidenedicyclohexylene, phenylene or isopropylidenediphenylene, $A_{23}$ is as defined above for $R_{21}$, and $X_4$ is as defined above for $X_2$ and $X_3$, and, when t is 3, $A_9$ is aliphatic $C_4$-$C_{15}$triacyl or aromatic $C_9$-$C_{12}$ triacyl or is 1,3,5-triazine-2,4,6-triyl and, when t is 4, $A_9$ is aliphatic $C_6$-$C_{12}$tetraacyl or aromatic $C_{10}$-$C_{12}$tetraacyl, $A_{10}$ is $C_1$-$C_{12}$alkyl, $C_5$-$C_8$cycloalkyl which is unsubstituted or mono-, di- or tri-substituted by $C_1$-$C_4$alkyl; $C_3$-$C_{12}$alkenyl, phenyl which is unsubstituted or mono-, di- or tri-substituted by $C_1$-$C_4$alkyl or $C_1$-$C_4$alkoxy; benzyl which is unsubstituted or mono-, di- or trisubstituted on the phenyl by $C_1$-$C_4$alkyl and/or monosubstituted by an OH group; $A_{11}$ is as defined above for $A_8$, u is 1, 2 or 3, and, when u is 1, $A_{12}$ is as defined for $A_{10}$ or is a group

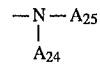

where $A_{24}$ and $A_{25}$ which can be identical or different are as defined for $A_{10}$ or $A_{24}$ is also hydrogen or aliphatic $C_2$-$C_{22}$acyl, cycloaliphatic $C_7$-$C_{15}$acyl, aromatic $C_7$-$C_{15}$acyl or arylaliphatic $C_8$-$C_{20}$acyl or a group —$COOA_{26}$ with $A_{26}$ being as defined above for $A_{14}$, and, when u is 2, $A_{12}$ is as defined above for $R_{21}$ or is a group of the formula (XVIIa) or (XVIIb) in which $A_{27}$ is as defined for $A_{10}$; $A_{28}$ is aliphatic $C_2$-$C_{14}$diacyl, cycloaliphatic $C_8$-$C_{14}$diacyl, aromatic $C_8$-$C_{14}$diacyl or arylaliphatic $C_9$-$C_{22}$diacyl and $A_{29}$ is as defined above for $A_{15}$, and, when u is 3, $A_{12}$ is a group of the formula (XVIII) in which v is an integer from 4 to 6.

Particularly preferred compounds which can be used according to the present invention are:

A) compounds of the formulae (IIa)–(IId) in which R is hydrogen, methyl, $C_6$-$C_8$alkoxy, cyclohexoxy, allyl, benzyl or acetyl, X is —O— or

where $R_7$ is hydrogen, $C_1$-$C_{10}$alkyl, cyclohexyl which is unsubstituted or mono-, di- or tri-substituted by $C_1$-$C_4$alkyl; benzyl or a group of the formula (III) in which $R_8$ is as defined for R, m is 1, 2, 3 or 4 and, when m is 1, $R_1$ is aliphatic $C_4$-$C_{22}$acyl, cycloaliphatic $C_7$-$C_{12}$acyl, aromatic $C_7$-$C_{12}$ acyl, arylaliphatic $C_8$-$C_{18}$acyl or heterocyclic $C_5$-$C_{14}$acyl. or, when X is —O—, $R_1$ is also a group of the formula (IV) in which $X_1$ is a group —$OR_9$ or

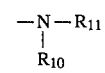

where $R_9$, $R_{10}$ and $R_{11}$ which can be identical or different are as defined above for $R_7$ or $C_3$-$C_{11}$ alkenyl, or the group

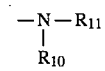

is 4-morpholinyl, or $X_1$ is also a group of the formula (V) where $R_{12}$ is $C_1$-$C_{10}$alkyl, cyclohexyl which is unsubstituted or mono-, di- or tri-substituted by $C_1$-$C_4$alkyl; benzyl or a group of the formula (III) and $R_{13}$ is $C_2$-$C_8$alkylene, cyclohexylenedimethylene, methylenedicyclohexylene or $C_4$-$C_{10}$alkylene interrupted by 1, 2 or 3 oxygen atoms or by 1 or 2 groups

where $R_{14}$ is a group of the formula (VI), or the group

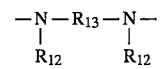

is 1,4-piperazinediyl or one of the groups

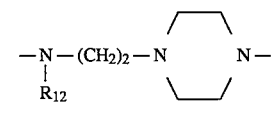

or

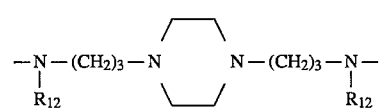

with $R_{12}$ being as defined above, or the group —X—$R_1$ is also one of the groups of tile formulae (VIIIa)–(VIIIe) in which $R_{15}$ is $C_4$-$C_{18}$alkyl or $C_4$-$C_{18}$alkenyl, $R_{16}$ is as defined above for $R_{12}$ or a group of the formula (IX) where $R_{21}$ is $C_4$–$C_{10}$alkylene, cyclohexylenedimethylene, methylenedicyclohexylene, a group

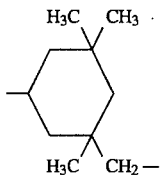

methylphenylene, methylenediphenylene or oxydiphenylene, $R_{17}$ is $C_1$–$C_4$alkylidene, carbonyl, oxalyl, ethylene or a group —$CH_2CO$—, $R_{18}$ is $C_1$–$C_4$acyl or ($C_1$–$C_4$alkoxy)-carbonyl, $R_{19}$ is $C_2$–$C_8$alkylene, cyclohexylenedimethylene, methylenedicyclohexylene or $C_4$–$C_{10}$alkylene interrupted by 1, 2 or 3 oxygen atoms or by 1 or 2

groups with $R_{18}$ being as defined above, and $R_{20}$ is a group

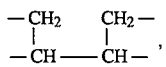

and, when m is 2, $R_1$ is $C_2$–$C_8$alkylene, $C_4$–$C_{10}$alkylene interrupted by 1, 2 or 3 oxygen atoms; cyclohexylenedimethylene, methylenedicyclohexylene, xylylene, a group

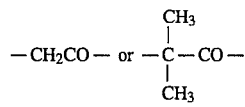

or aliphatic $C_2$–$C_{12}$diacyl, cycloaliphatic $C_8$–$C_{12}$diacyl, aromatic $C_8$–$C_{12}$diacyl, arylaliphatic $C_{10}$–$C_{22}$diacyl or heterocyclic $C_6$–$C_{16}$diacyl, and, when m is 3, $R_1$ is aliphatic $C_5$–$C_{14}$triacyl or aromatic $C_9$–$C_{10}$triacyl, and, when m is 4, $R_1$ is aliphatic $C_8$–$C_{12}$tetraacyl or aromatic $C_{10}$–$C_{12}$tetraacyl; $R_2$ is methyl, methoxy, ethoxy or OH, n is a number from 5 to 40, p is a number from zero to 20, $R_3$ is OH, methoxy, ethoxy or a group $(CH_3)_3SiO$—, $R_4$ is hydrogen, methyl, ethyl or a group $(CH_3)_3Si$—, and, when n+p is a number from 3 to 10, $R_3$ and $R_4$ also form a direct bond, $R_5$ is one of the groups of the formulae (Xa)–(Xc) in which $R_{22}$ is hydrogen or $C_1$–$C_{12}$alkyl, $R_{23}$ and $R_{24}$ which can be identical or different are $C_1$–$C_{10}$alkyl or $R_{23}$ and $R_{24}$, together with the carbon atom to which they are linked, are a $C_6$–$C_{12}$cycloalkylidene group, $R_{25}$ is $C_4$–$C_{18}$alkyl, $R_{26}$ is hydrogen or $C_1$–$C_{12}$alkyl and $R_{27}$ is one of the groups of the formulae (XIa)–(XIf), and $R_6$ is a group of the formula (XIIa) or (XIIb) in which $R_{28}$ is $C_2$–$C_8$alkylene and $R_{29}$ is as defined above for $R_7$;

B) compounds of the formulae (XIIIa)–(XIIIc) in which $A_1$ is $C_1$–$C_{10}$alkyl, cyclohexyl which is unsubstituted or mono-, di- or tri-substituted by $C_1$–$C_4$alkyl; phenyl which is unsubstituted or mono-, di- or tri-substituted by $C_1$–$C_4$alkyl or $C_1$–$C_4$alkoxy; benzyl or a group —$A_{13}COOA_{14}$ where $A_{13}$ is $C_1$–$C_4$alkylene and $A_{14}$ is $C_4$–$C_{18}$ alkyl, cyclohexyl which is unsubstituted or mono-, di- or tri-substituted by $C_1$–$C_4$alkyl; or benzyl, $A_3$, $A_4$, $A_5$ and $A_6$ which can be identical or different are hydrogen or methyl, s is 1 or 2, and, when s is 1, $A_2$ is hydrogen, $C_1$–$C_{16}$alkyl, allyl, benzyl or a group —$A_{13}$—$COOA_{14}$ as defined above, and, when $A_2$ is hydrogen, $A_1$ can also be a group of the formula (XIV) where $A_{15}$ is $C_2$–$C_8$alkylene, cyclohexylenedimethylene or isopropylidenedicyclohexylene, and, when s is 2, $A_2$ is $C_2$–$C_8$alkylene or xylylene, $A_7$ is phenyl which is unsubstituted or mono-, di- or tri-substituted by $C_1$–$C_4$alkyl or $C_1$–$C_4$alkoxy; $A_8$ is hydrogen, $C_1$–$C_8$alkyl, allyl or benzyl, t is 1, 2, 3 or 4, and, when t is 1, $A_9$ is aliphatic $C_4$–$C_{22}$acyl, cycloaliphatic $C_7$–$C_{12}$acyl, aromatic $C_7$–$C_{12}$acyl or arylaliphatic $C_8$–$C_{18}$acyl or one of the groups of the formulae (XVa)–(XVc) in which $A_{16}$ is as defined above for $A_{14}$; $A_{17}$ and $A_{18}$ which can be identical or different are hydrogen $C_1$–$C_{10}$alkyl cyclohexyl which is unsubstituted or mono-, di- or tri-substituted by $C_1$–$C_4$alkyl; benzyl or phenyl, or the group

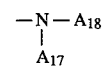

is 4-morpholinyl, and $X_2$ and $X_3$ which can be identical or different are a group —$OA_{19}$ or

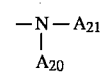

where $A_{19}$, $A_{20}$ and $A_{21}$ which can be identical or different are as defined above for $A_{17}$ and $A_{18}$, and, when t is 2, $A_9$ is aliphatic $C_2$–$C_{12}$diacyl, cycloaliphatic $C_8$–$C_{12}$ diacyl, aromatic $C_8$–$C_{12}$diacyl or arylaliphatic $C_{10}$–$C_{22}$diacyl or a group of the formulae (XVIa)–(XVIc) in which $A_{22}$ is $C_2$–$C_8$alkylene, cyclohexylenedimethylene, isopropylidenedicyclohexylene or isopropylidenediphenylene, $A_{23}$ is as defined above for $R_{21}$ and $X_4$ is as defined above for $X_2$ and $X_3$, and, when t is 3, $A_9$ is aliphatic $C_5$–$C_{14}$triacyl or aromatic $C_9$–$C_{10}$triacyl or is 1,3,5-triazine-2,4,6-triyl, and, when t is 4, $A_9$ is aliphatic $C_8$–$C_{12}$tetraacyl or aromatic $C_{10}$–$C_{12}$tetraacyl, $A_{10}$ is $C_1$–$C_{10}$alkyl, cyclohexyl which is unsubstituted or mono-, di- or tri-substituted by $C_1$–$C_4$alkyl; allyl, phenyl which is unsubstituted or mono-, di- or tri-substituted by $C_1$–$C_4$alkyl or $C_1$–$C_4$alkoxy; or benzyl, $A_{11}$ is as defined above for $A_8$, u is 1, 2 or 3, and, when u is 1, $A_{12}$ is as defined for $A_{10}$ or is a group

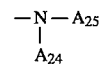

where $A_{24}$ and $A_{25}$ which can be identical or different are as defined for $A_{10}$, or $A_{24}$ is also hydrogen or aliphatic $C_4$–$C_{22}$acyl, cycloaliphatic $C_7$–$C_{12}$acyl, aromatic $C_7$–$C_{12}$acyl or arylaliphatic $C_8$–$C_{18}$acyl or a group —$COOA_{26}$ with $A_{26}$ being as defined above for $A_{14}$, and, when u is 2, $A_{12}$ is as defined above for $R_{21}$ or is a group of the formula (XVIIa) or (XVIIb) in which $A_{27}$ is as defined for $A_{10}$; $A_{28}$ is aliphatic $C_2$–$C_{12}$diacyl, cycloaliphatic $C_8$–$C_{12}$diacyl, aromatic $C_8$–$C_{12}$diacyl or arylaliphatic $C_{10}$–$C_{22}$diacyl and $A_{29}$ is as defined above for $A_{15}$, and, when u is 3, $A_{12}$ is a group of the formula (XVIII) in which v is 6.

Compounds of special interest which can be used according to the present invention are:

A) compounds of the formulae (IIa)–(IId) in which R is hydrogen, methyl or acetyl, X is —O— or

where $R_7$ is hydrogen, $C_1$–$C_8$alkyl, cyclohexyl, 2,2,6,6-tetramethyl-4-piperidyl, 1,2,2,6,6-pentamethyl-4-piperidyl or 1-acetyl-2,2,6,6-tetramethyl-4-piperidyl, m is 1, 2, 3 or 4, and, when m is 1, $R_1$ is aliphatic $C_8$–$C_{22}$acyl, cycloaliphatic $C_7$–$C_{11}$acyl, aromatic $C_7$–$C_{11}$acyl or arylaliphatic $C_8$–$C_{17}$acyl and, when X is —O—, $R_1$ is also a group of the formula (IV) in which $X_1$ is a group —$OR_9$ or

where $R_9$, $R_{10}$ and $R_{11}$ which are identical or different are as defined above for $R_7$ or the group

is 4-morpholinyl, or $X_1$ is also a group of the formula (V) where $R_{12}$ is 2,2,6,6-tetramethyl-4-piperidyl, 1,2,2,6,6-pentamethyl-4-piperidyl or 1-acetyl-2,2,6,6-tetramethyl-4-piperidyl and $R_{13}$ is $C_2$–$C_6$alkylene or $C_6$–$C_{10}$alkylene interrupted by 2 or 3 oxygen atoms or by 1 or 2

groups where $R_{14}$ is a group of the formula (VI) or the group —X—$R_1$ is also one of the groups of the formulae (VIIIa)–(VIIIe) in which $R_{15}$ is $C_8$–$C_{18}$alkyl, $R_{16}$ is $C_1$–$C_8$alkyl, cyclohexyl or a group of the formula (IX) in which $R_{21}$ is $C_4$–$C_9$alkylene, cyclohexylenedimethylene, methylenedicyclohexylene, a group

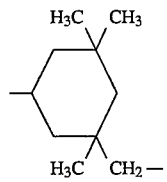

methylphenylene or methylenediphenylene, $R_{17}$ is methylene, carbonyl, oxalyl or ethylene, $R_{18}$ is acetyl, methoxycarbonyl or ethoxycarbonyl, $R_{19}$ is $C_2$–$C_6$alkylene or $C_6$–$C_{10}$alkylene interrupted by 2 or 3 oxygen atoms or by 1 or 2

groups with $R_{18}$ being as defined above and $R_{20}$ is a group

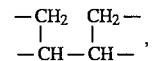

and, when m is 2, $R_1$ is $C_2$–$C_6$alkylene, xylylene, a group —$CH_2CO$— or

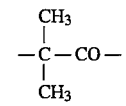

or aliphatic $C_2$–$C_{10}$diacyl, cycloaliphatic $C_8$–$C_{10}$diacyl, aromatic $C_8$–$C_{10}$diacyl, arylaliphatic $C_{10}$–$C_{22}$diacyl or heterocyclic $C_{10}$–$C_{15}$diacyl, and, when m is 3, $R_1$ is aliphatic $C_5$–$C_8$triacyl, and, when m is 4, $R_1$ is aliphatic $C_8$–$C_{10}$tetraacyl, $R_2$ is methyl or OH, n is a number from 5 to 35, p is a number from zero to 15, $R_3$ is OH or a group $(CH_3)_3SiO$—, $R_4$ is hydrogen or a group $(CH_3)_3Si$—, $R_5$ is one of the groups of the formulae (Xa)–(Xc) in which $R_{22}$ is hydrogen or $C_1$–$C_8$alkyl, $R_{23}$ and $R_{24}$, together with the carbon atom to which they are linked, are a $C_6$–$C_{12}$cycloalkylidene group, $R_{25}$ is $C_8$–$C_{18}$alkyl, $R_{26}$ is hydrogen or $C_1$–$C_8$alkyl and $R_{27}$ is one of the groups of the formulae (XIa)–(XId), and $R_6$ is a group of the formula (XIIa) where $R_{28}$ is $C_2$–$C_6$alkylene;

B) compounds of the formula (XIIIa)–(XIIIc) in which $A_1$ is $C_1$–$C_8$alkyl, cyclohexyl, phenyl, benzyl or a group —$A_{13}$—$COOA_{14}$ where $A_{13}$ is $C_1$–$C_4$alkylene and $A_{14}$ is $C_8$–$C_{18}$alkyl, $A_3$, $A_4$, $A_5$ and $A_6$ are hydrogen, s is 1 or 2, and, when s is 1, $A_2$ is hydrogen, $C_1$–$C_{14}$alkyl, benzyl or a group —$A_{13}$—$COOA_{14}$ as defined above and, when $A_2$ is hydrogen, $A_1$ can also be a group of the formula (XIV) with $A_{15}$ being $C_2$–$C_6$alkylene, and when s is 2, $A_2$ is $C_2$–$C_6$alkylene or xylylene, $A_7$ is phenyl, $A_8$ is hydrogen, $C_1$–$C_4$alkyl or benzyl, t is 1, 2 or 3 and, when t is 1, $A_9$ is aliphatic $C_8$–$C_{22}$acyl, cycloaliphatic $C_7$–$C_{11}$ acyl, aromatic $C_7$–$C_{11}$acyl or arylaliphatic $C_8$–$C_{17}$acyl or a group of the formula (XVa) or (XVb) in which $A_{16}$ is $C_8$–$C_{18}$alkyl, cyclohexyl or t-butylcyclohexyl, $A_{17}$ is hydrogen, $A_{18}$ is $C_1$–$C_8$alkyl, cyclohexyl or benzyl, and, when t is 2, $A_9$ is aliphatic $C_2$–$C_{10}$diacyl, cycloaliphatic $C_8$–$C_{10}$diacyl, aromatic $C_8$–$C_{10}$diacyl or arylaliphatic $C_{10}$–$C_{22}$diacyl or a group of the formula (XVIa) or (XVIb) in which $A_{22}$ is $C_4$–$C_8$alkylene, cyclohexylenedimethylene or isopropylidenedicyclohexylene and $A_{23}$ is as defined above for $R_{21}$ and, when t is 3, $A_9$ is aliphatic $C_5$–$C_8$triacyl or benzenetricarbonyl, $A_{10}$ is $C_1$–$C_8$alkyl, cyclohexyl, phenyl or benzyl, $A_{11}$ is as defined above for $A_8$, u is 1 or 2 and, when u is 1, $A_{12}$ is as defined for $A_{10}$ or is a group

where $A_{24}$ is hydrogen and $A_{25}$ is as defined above for $A_{10}$, and, when u is 2, $A_{12}$ is as defined above for $R_{21}$.

Compounds of particular interest which can be used according to the present invention are:

A) compounds of the formulae (IIa)–(IId) in which R is hydrogen or methyl, X is —O—, m is 1, 2, 3 or 4, and, when m is 1, $R_1$ is aliphatic $C_{12}$–$C_{22}$acyl or benzoyl or a group of the formula (IV) in which $X_1$ is a group

where $R_{10}$ and $R_{11}$ which can be identical or different are $C_1$–$C_4$alkyl, cyclohexyl, 2,2,6,6-tetramethyl-4-piperidyl or 1,2,2,6,6-pentamethyl-4-piperidyl or $R_{10}$ is also hydrogen, or $X_1$ is also a group of the formula (V) where $R_{12}$ is 2,2,6,6-tetramethyl-4-piperidyl or 1,2,2,6,6-pentamethyl-4-piperidyl and $R_{13}$ is a group —$(CH_2)_{2-6}$—, or the group —X—$R_1$ is also one of the groups of the formulae (VIIIa)–(VIIId) in which $R_{15}$ is $C_{12}$–$C_{18}$alkyl, $R_{16}$ is a group of the formula (IX) where $R_{21}$ is $C_6$–$C_9$alkylene, methylenedicyclohexylene or a group

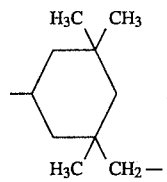

$R_{17}$ is carbonyl, $R_{18}$ is methoxycarbonyl or ethoxycarbonyl and $R_{19}$ is a group —$(CH_2)_{2-6}$—, and, when m is 2, $R_1$ is one of the groups

—CO$(CH_2)_{2-8}$CO—,

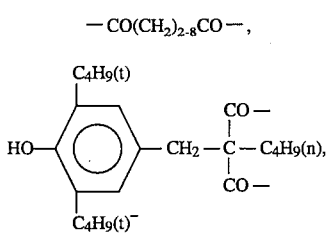

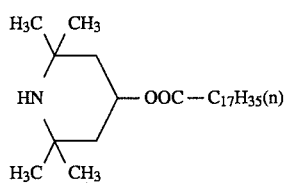
(compound 1A)

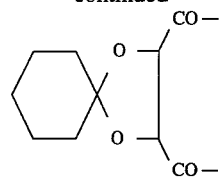

or

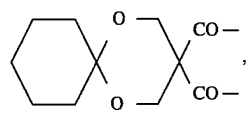

and, when m is 3, $R_1$ is triacyl derived from citric acid or nitrilotriacetic acid, and, when m is 4, $R_1$ is 1,2,3,4-butanetetracarbonyl, $R_2$ is methyl, n is a number from 5 to 30, p is zero, $R_3$ is OH, $R_4$ is hydrogen, $R_5$ is a group of the formula (Xa) or (Xb) in which $R_{22}$ is hydrogen or methyl, $R_{23}$ and $R_{24}$, together with a carbon atom to which they are linked, are a cyclododecylidene group, $R_{25}$ is $C_{12}$–$C_{18}$alkyl and $R_{26}$ is hydrogen or methyl, and $R_6$ is a group of the formula (XIIa) in which $R_{28}$ is ethylene;

B) compounds of the formulae (XIIIa)–(XIIIc) in which $A_1$ is phenyl or a group

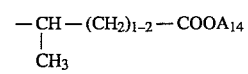

with $A_{14}$ being $C_{12}$–$C_{18}$alkyl, $A_3$, $A_4$, $A_5$ and $A_6$ are hydrogen, s is 1 or 2 and, when s is 1, $A_2$ is hydrogen, $C_1$–$C_{12}$alkyl or benzyl, and, when s is 2, $A_2$ is xylylene, $A_7$ is phenyl, $A_8$ is hydrogen or methyl, t is 1 or 2 and, when t is 1, $A_9$ is aliphatic $C_{10}$–$C_{22}$acyl, benzoyl or a group of the formula (XVa) or (XVb) in which $A_{16}$ is $C_{12}$–$C_{18}$alkyl, $A_{17}$ is hydrogen, $A_{18}$ is $C_1$–$C_4$alkyl or cyclohexyl, and, when t is 2, $A_9$ is a group —CO—$(CH_2)_{2-8}$CO— or a group of the formula (XVIa) or (XVIb) in which $A_{22}$ is $C_4$–$C_6$alkylene and $A_{23}$ is as defined above for $R_{21}$; $A_{10}$ is $C_1$–$C_4$alkyl or phenyl, $A_{11}$ is hydrogen or methyl, u is 1 or 2 and, when u is 1, $A_{12}$ is $C_1$–$C_4$alkyl, phenyl or cyclohexyl and, when u is 2, $A_{12}$ is as defined above for $R_{21}$.

Examples of particularly preferred compounds (A) are:

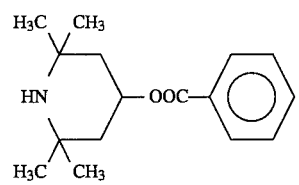
(compound 2A)

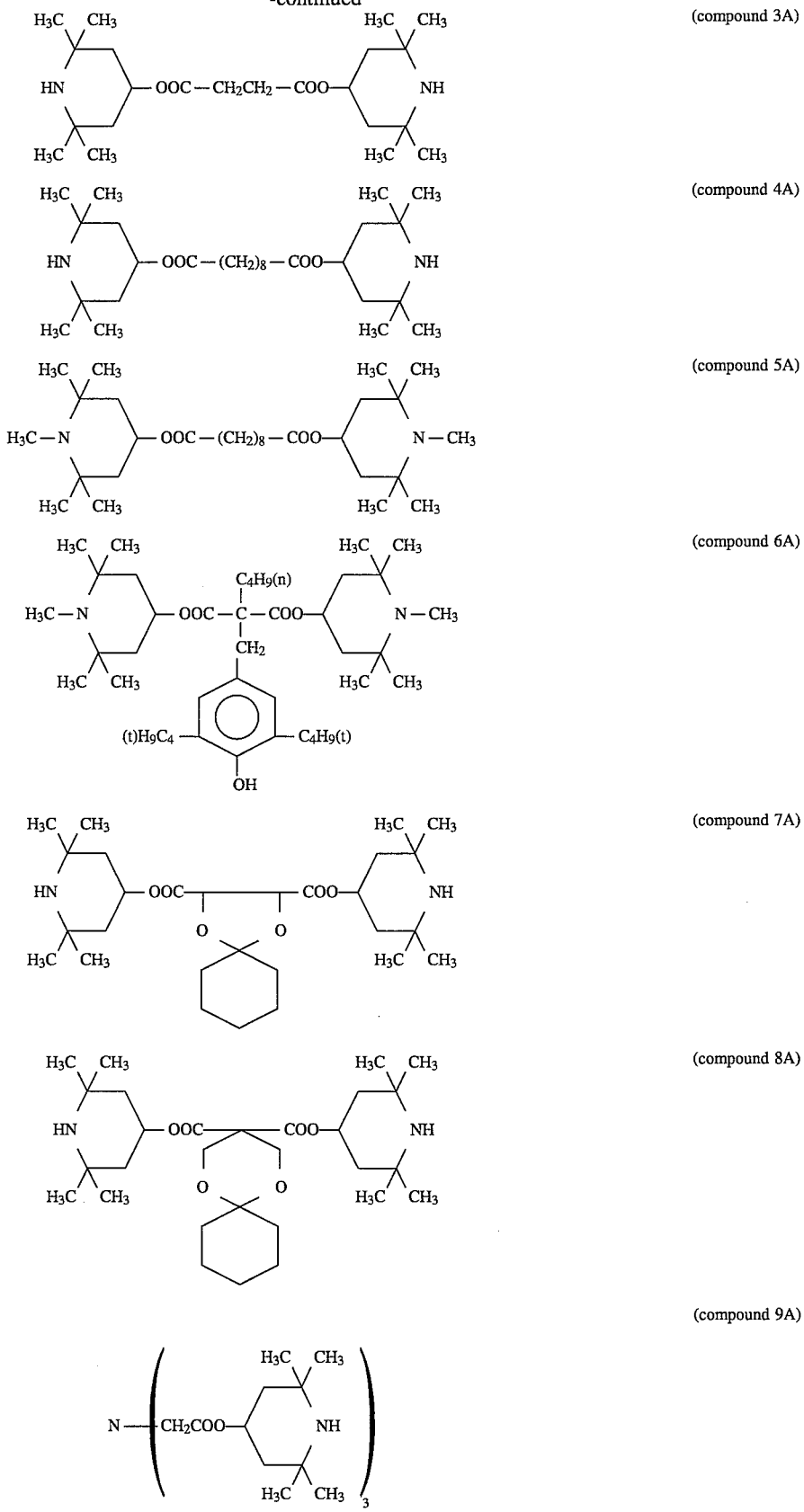

(compound 10A)
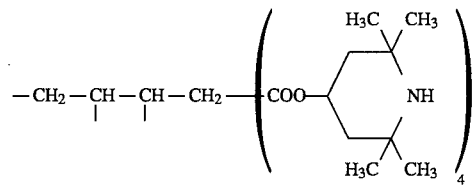
(compound 11A)
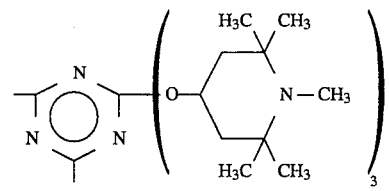
(compound 12A)
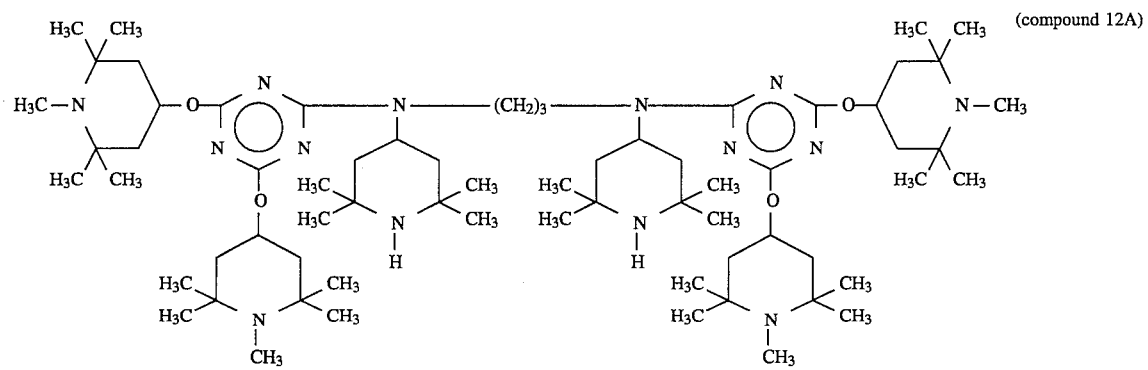
(compound 13A)
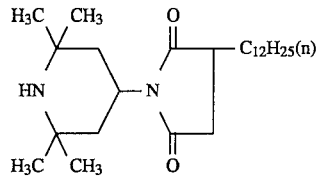
(compound 14A)
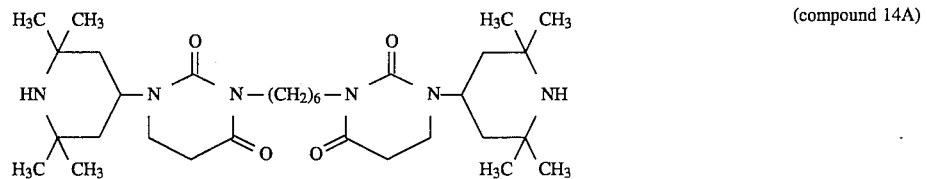
(compound 15A)
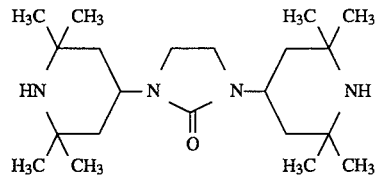
(compound 16A)
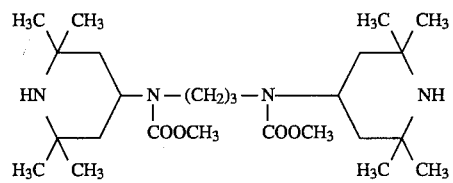

-continued
(compound 17A) 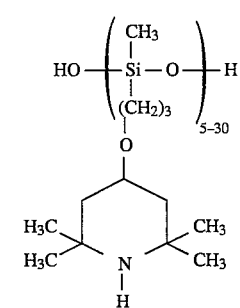
(compound 18A) 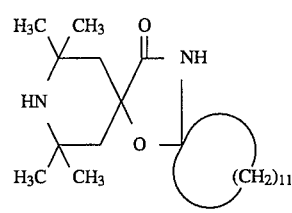
(compound 19A) 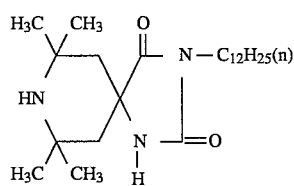
(compound 20A) 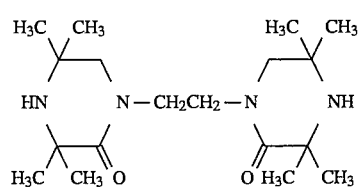
Examples of particularly preferred compounds (B) are:
(compound 1B) 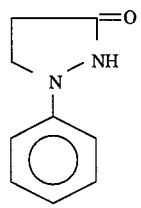
(compound 2B) 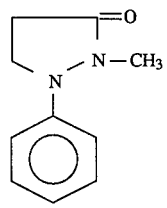
(compound 3B) 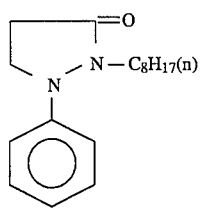
(compound 4B) 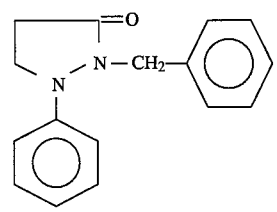
(compound 5B) 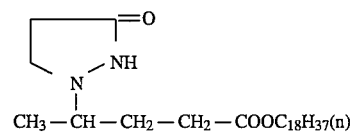
(compound 6B) 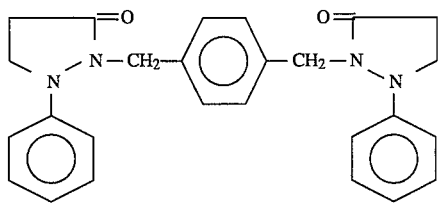
(compound 7B) 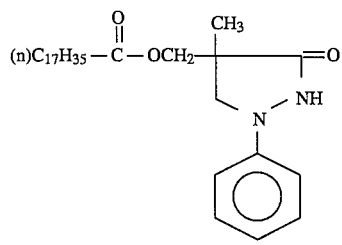
(compound 8B) 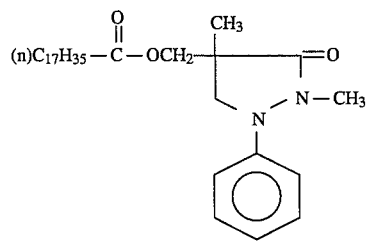

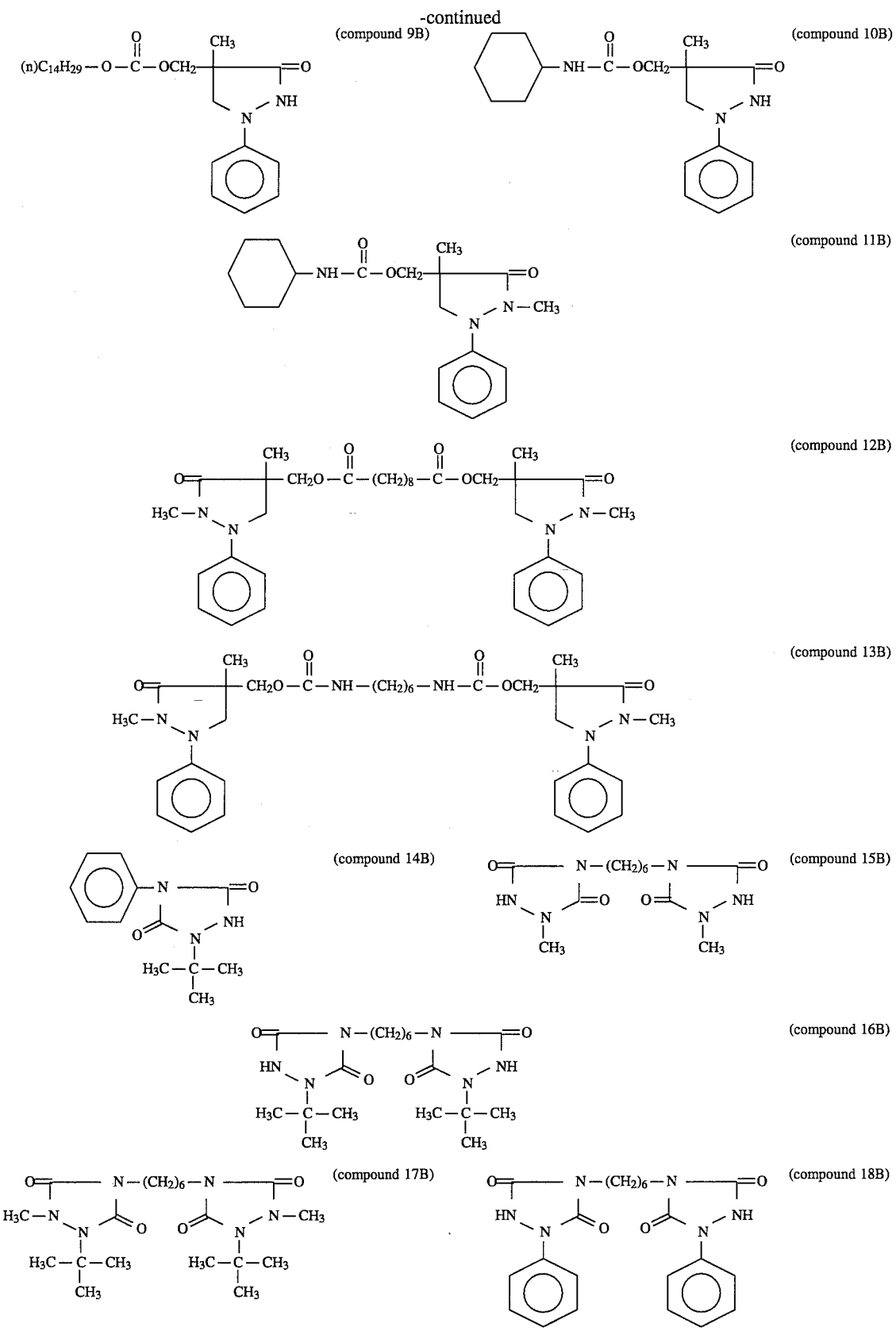
Compounds (A) which are also of interest are those of the formula (IIa) in which R is hydrogen or methyl, X is —O—, m is 1 or 2 and, when m is 1, —X—R₁ is a group of the formula (VIIId) in which R is as defined above, R₁ is ($C_1$–$C_8$alkoxy)carbonyl and $R_{19}$ is $C_2$–$C_{12}$alkylene and, when m is 2, $R_{18}$ is a group —CO—$(CH_2)_{2-8}$—CO—.

Compounds (B) which are also of interest are those of the formula (XIIIa), (XIIIb) or (XIIIc) in which s is 1, $A_1$ is phenyl, $A_2$, $A_3$, $A_4$, $A_5$ and $A_6$ are hydrogen, t is 1, $A_7$ is phenyl, $A_8$ is hydrogen or methyl, $A_9$ is aliphatic $C_{10}$–$C_{22}$acyl, u is 2, $A_{10}$ is $C_1$–$C_4$alkyl, $A_{11}$ is hydrogen or methyl and $A_{12}$ is $C_6$–$C_9$alkylene.

Furthermore, preferred compounds (A) are those of the formula (IIa) in which R is hydrogen or methyl, X is —O—, m is 2 and $R_1$ is a group —CO—$(CH_2)_{2-8}$—CO—.

Preferred compounds (B) are also those of the formula (XIIIb) or (XIIIc) in which t is 1, $A_7$ is phenyl, $A_8$ is hydrogen or methyl, $A_9$ is aliphatic $C_{10}$–$C_{22}$acyl, u is 2, $A_{10}$ is $C_1$–$C_4$alkyl, $A_{11}$ is hydrogen or methyl and $A_{12}$ is $C_6$–$C_9$alkylene.

The compounds of the formulae (IIa)–(IId) are known and can be prepared by conventional methods reported in the cited prior art.

The compounds of the formulae (XIIIa)–(XIIIc) can be prepared by known methods reported in the literature.

In particular, the compounds of the formula (XIIIa) can be prepared, for example, as reported in Tetrahedron Letters, volume 26, 5663 (1985) and Z. Chem., volume 8, 273 (1968); the compounds of the formula (XIIIb) can be prepared according to Japanese Patent 56-86,165 and GB Patent 2,073,734; the compounds of the formula (XIIIc) can be prepared as reported, for example, in the Patents DE 1,200,825 and WO 87/07,892.

Some of the compounds of the formulae (XIIIa)–(XIIIc) are novel and constitute a further subject of the present invention.

These novel compounds are compounds of the formulae (XIIIa)–(XIIIc)

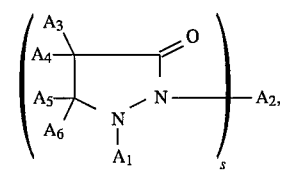
(XIIIa)

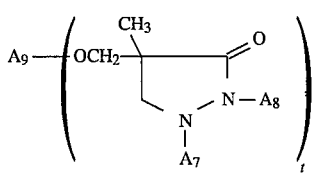
(XIIIb)

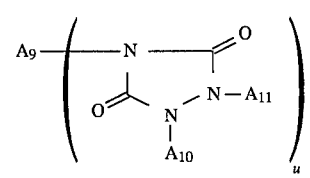
(XIIIc)

in which $A_1$ is phenyl or a group —$A_{13}$—COO$A_{14}$, where $A_{13}$ is $C_1$–$C_6$alkylene and $A_{14}$ is $C_3$–$C_{18}$alkyl or $C_5$–$C_{12}$cycloalkyl, $A_3$, $A_4$, $A_5$ and $A_6$ are hydrogen, s is 1 or 2 and, when s is 1, $A_2$ is $C_2$–$C_{18}$alkyl or a group —$A_{13}$—COO$A_{14}$ as defined above, and, when $A_1$ is a group —$A_{13}$—COO$A_{14}$ or a group of the formula

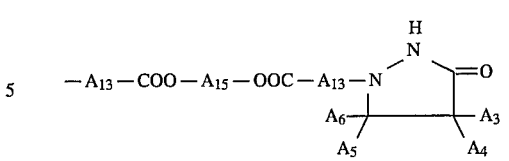
(XIV)

with $A_3$, $A_4$, $A_5$, $A_6$ and $A_{13}$ being as defined above and $A_{15}$ being $C_2$–$C_{12}$alkylene, $C_4$–$C_{12}$alkylene interrupted by 1, 2 or 3 oxygen atoms; cyclohexylene, cyclohexylenedimethylene or isopropylidenedicyclohexylene, $A_2$ can also be hydrogen, and, when s is 2, $A_2$ is xylylene; $A_7$ is phenyl, $A_8$ is $C_1$–$C_{18}$alkyl, t is 1, 2 or 3 and, when t is 1, $A_9$ is aliphatic $C_1$–$C_{18}$acyl or one of the groups of the formulae (XVa)–(XVc)

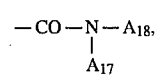
(XVa)

—CO—N—$A_{18}$, (XVb)
  |
  $A_{17}$

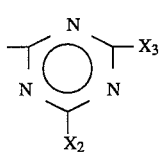
(XVc)

in which $A_{16}$ is $C_1$–$C_{18}$alkyl or $C_5$–$C_{12}$cycloalkyl, $A_{17}$ and $A_{18}$ which can be identical or different are as defined above for $A_{16}$ or hydrogen or phenyl, $X_2$ and $X_3$ which can be identical or different are a group —O$A_{19}$ or

where $A_{19}$, $A_{20}$ and $A_{21}$ which can be identical or different are as defined above for $A_{17}$ and $A_{18}$, and, when t is 2, $A_9$ is aliphatic $C_2$–$C_{14}$diacyl or a group of the formulae (XVIa)–(XVIc)

—COO—$A_{22}$—OOC—, (XVIa)

—CONH—$A_{23}$—NHCO—, (XVIb)

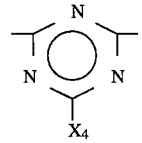
(XVIc)

in which $A_{22}$ is $C_2$–$C_{12}$alkylene, $C_4$–$C_{12}$alkylene interrupted by 1, 2 or 3 oxygen atoms; cyclohexylene, cyclohexylenedimethylene or isopropylidenedicyclohexylene, $A_{23}$ is $C_2$–$C_{12}$alkylene, cyclohexylene, cyclohexylenedimethylene, methylenedicyclohexylene, a group

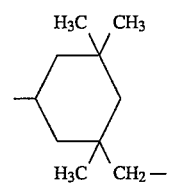

or phenylene and $X_4$ is as defined above for $X_2$ and $X_3$, and, when t is 3, $A_9$ is 1,3,5-triazine-2,4,6-triyl; $A_{10}$ is $C_1$–$C_{18}$alkyl, $A_{11}$ is $C_1$–$C_{18}$alkyl, u is 2 and $A_{12}$ is as defined above for $A_{23}$.

Those novel compounds of the formulae (XIIIa)–(XIIIc) are preferred, wherein $A_{14}$ is $C_3$–$C_{18}$alkyl, when s is 1, $A_2$ is $C_2$–$C_{18}$alkyl and when $A_1$ is a group —$A_{13}$—COO$A_{14}$, $A_2$ is also hydrogen; t is 1 and $A_9$ is aliphatic $C_1$–$C_{18}$acyl or a group of the formula (XVb) in which $A_{17}$ and $A_{18}$ which can be identical or different are hydrogen or $C_5$–$C_{12}$cycloalkyl; and $A_{12}$ is $C_2$–$C_{12}$alkylene.

Also the novel compounds can be prepared by analogy to known methods. For example, the novel compounds of the formula (XIIIa) wherein $A_1$ is phenyl and $A_2$ is $C_2$–$C_{18}$alkyl or xylylene can be prepared by reaction of a compound of the formula

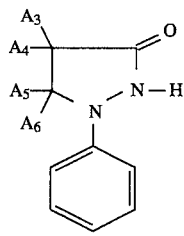

wherein $A_3$, $A_4$, $A_5$ and $A_6$ are as defined above with the appropriate alkyl halide or xylylene halide (the halide being preferably chloride or bromide), in a polar solvent such as dimethylformamide using e.g. $K_2CO_3$ or NaH as base.

Analogously, the novel compounds of the formula (XIIIb) can be prepared, for example, by alkylation of a compound of the formula

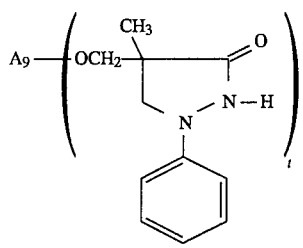

wherein t and $A_9$ are as defined above.

Also the novel compounds of the formula (XIIIc) can be prepared, for example, by alkylation of a compound of the formula

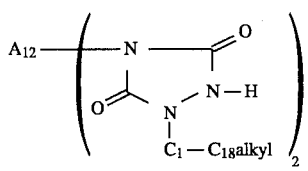

wherein $A_{12}$ is as defined above.

The novel compounds of the formula (XIIIa) wherein $A_1$ is a group —$A_{13}$—COO$A_{14}$ or a group

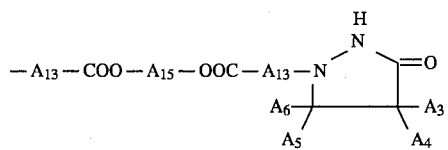

with $A_3$, $A_4$, $A_5$, $A_6$, $A_{13}$, $A_{14}$ and $A_{15}$ being as defined above, can be prepared, for example, by esterification of a compound of the formula

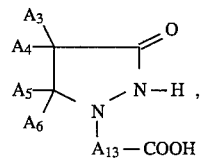

the preparation of which is e.g. described in Z. Chem., 8, 273 (1968), with an appropriate monoalcohol ($A_{14}$—OH) or dialcohol (HO—$A_{15}$—OH).

As mentioned at the outset, the synergistic mixtures of compounds (A) and compounds (B) of the present invention are highly effective in improving the light stability, heat stability and oxidation stability of polymeric organic materials.

Examples of such polymeric organic materials which can be stabilised are:

1. Polymers of monoolefins and diolefins, for example polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE), linear low density polyethylene (LLDPE), branched low density polyethylene (BLDPE).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefines and diolefines with each other or with other vinyl monomers, such as, for example, ethylene/propylene, linear low density polyethylene (LLDPE) and its mixtures with low density polyethylene (LDPE), propylene/butene-1, ethylene/hexene, ethylene/ethylpentene, ethylene/heptene, ethylene/octene, propylene/isobutylene, ethylene/butene-1, propylene/butadiene, isobutylene/isoprene, ethylene/alkyl acrylates, ethylene/alkyl methacrylates, ethylene/vinyl acetate copolymers and their copolymers with carbon monoxide or ethylene/acrylic acid copolymers and their salts (ionomers) and terpolymers of ethylene with propylene and a diene, such as hexadiene, dicyclopentadiene or ethylidene-norbornene; as well as mixtures of such copolymers and their mixtures with polymers mentioned in 1) above, for example polypropylene/ethylene-propylene-copolymers, LDPE/ethylene-vinyl acetate copolymers (EVA), LDPE/ethylene-acrylic acid copolymers (EAA), LLDPE/EVA, LLDPE/EAA and statistical or alternating polyalkylene/carbon monoxide-copolymers as well as their mixtures with other polymers, for example polyamide.

3a. Hydrocarbon resins (for example $C_5$–$C_9$) and hydrogenated modifications thereof (for example tackyfiers) and mixtures of polyalkylenes and starch.

4. Polystyrene, poly-(p-methylstyrene), poly-(α-methylstyrene).

5. Copolymers of styrene or α-methylstyrene with dienes or acrylic derivatives, such as, for example, styrene/butadiene, styrene/acrylonitrile, styrene/alkyl methacrylate, styrene/maleic anhydride, styrene/butadiene/alkyl acrylate, styrene/butadiene/alkyl methacrylate styrene/acrylonitrile/methyl acrylate; mixtures of high impact strength from styrene copolymers and another polymer, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene/styrene.

6. Graft copolymers of styrene or α-methylstyrene such as, for example, styrene on polybutadiene, styrene on polybutadiene-styrene or polybutadiene-acrylonitrile; styrene and acrylonitrile (or methacrylonitrile) on polybutadiene; styrene and maleic anhydride or maleimide on polybutadiene; styrene, acrylonitrile and maleic anhydride or maleimide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures thereof with the copolymers listed under 5), for instance the copolymer mixtures known as ABS-, MBS-, ASA- or AES-polymers.

7. Halogen-containing polymers, such as polychloroprene, chlorinated rubbers, chlorinated or sulfochlorinated polyethylene, copolymers of ethylene and chlorinated ethylene, epichlorohydrin homo- and copolymers, polymers from halogen-containing vinyl compounds, as for example, poly-vinylchloride, polyvinylidene chloride, polyvinyl fluoride, polyvinylidene fluoride, as well as copolymers thereof, as for example, vinyl chloride/vinylidene chloride, vinyl chloride/vinyl acetate or vinylidene chloride/vinyl acetate copolymers.

8. Polymers which are derived from α,β-unsaturated acids and derivatives thereof, such as polyacrylates and polymethacrylates, with butyl acrylate impact resistant modified polymethyl methacrylate, polyacrylamide and polyacrylonitrile.

9. Copolymers from the monomers mentioned under 8) with each other or with other unsaturated monomers, such as, for instance, acrylonitrile/butadiene, acrylonitrile/alkyl acrylate, acrylonitrile/alkoxyalkyl acrylate or acrylonitrile/vinyl halogenide copolymers or acrylonitrile/alkyl methacrylate/butadiene terpolymers.

10. Polymers which are derived from unsaturated alcohols and amines, or acyl derivatives thereof or acetals thereof, such as polyvinyl alcohol, polyvinyl acetate, polyvinyl stearate, polyvinyl benzoate, polyvinyl maleate, polyvinyl butyral, polyallyl phthalate or polyallylmelamine; as well as theft copolymers with olefins mentioned in 1) above.

11. Homopolymers and copolymers of cyclic ethers, such as polyalkylene glycols, polyethylene oxide, polypropylene oxide or copolymers thereof with bis-glycidyl ethers.

12. Polyacetals, such as polyoxymethylene and those polyoxymethylenes which contain ethylene oxide as a comonomer; polyacetals modified with thermoplastic polyurethanes, acrylates or MBS.

13. Polyphenylene oxides and sulfides, and mixtures of polyphenylene oxides with polystyrene or polyamides.

14. Polyurethanes which are derived from polyethers, polyesters or polybutadienes with terminal hydroxyl groups on the one side and aliphatic or aromatic polyisocyanates on the other side, as well as precursors thereof (polyisocyanates, polyols or prepolymers).

15. Polyamides and copolyamides which are derived from diamines and dicarboxylic acids and/or from aminocarboxylic acids or the corresponding lactams, such as polyamide 4, polyamide 6, polyamide 6/6, 6/10, 6/9, 6/12, 4/6, 12/12 polyamide 11, polyamide 12, aromatic polyamides obtained by condensation of m-xylene diamine and adipic acid; polyamides prepared from hexamethylenediamine and isophthalic or/and terephthalic acid and optionally an elastomer as modifier, for example poly-2,4,4,-trimethylhexamethylene terephthalamide or poly-m-phenylene isophthalamide. Further copolymers of the aforementioned polyamides with polyolefins, olefin copolymers, ionomers or chemically bonded or grafted elastomers; or with polyethers, such as for instance, with polyethylene glycols, polypropylene glycols or polytetramethylene glycols. Polyamides or copolyamides modified with EPDM or ABS. Polyamides condensed during processing (RIM-polyamide systems).

16. Polyureas, polyimides and polyamide-imides.

17. Polyesters which are derived from dicarboxylic acids and diols and[ch]or from hydroxycarboxylic acids or the corresponding lactones, such as polyethylene terephthalate, polybutylene terephthalate, poly-1,4-dimethylolcyclohexane terephthalate, poly-[2,2,-(4-hydroxyphenyl)-propane]terephthalate and polyhydroxybenzoates as well as block-copolyether-esters derived from polyethers having hydroxyl end groups.

18. Polycarbonates and polyester-carbonates.

19. Polysulfones, polyether-sulfones and polyether-ketones.

20. Crosslinked polymers which are derived from aldehydes on the one hand and phenols, ureas and melamines on the other hand, such as phenol/formaldehyde resins, urea/formaldehyde resins and melamine/formaldehyde resins.

21. Drying and non-drying alkyd resins.

22. Unsaturated polyester resins which are derived from copolyesters of saturated and unsaturated dicarboxylic acids with polyhydric alcohols and vinyl compounds as crosslinking agents, and also halogen-containing modifications thereof of low inflammability.

23. Thermosetting acrylic resins, derived from substituted acrylic esters, such as epoxy-acrylates, urethane-acrylates or polyester-acrylates.

24. Alkyd resins, polyester resins or acrylate resins in admixture with melamine resins, urea resins, polyisocyanates or epoxide resins as crosslinking agents.

25. Crosslinked epoxide resins which are derived from polyepoxides, for example from bis-glycidyl ethers or from cycloaliphatic diepoxides.

26. Natural polymers, such as cellulose, rubber, gelatine and derivatives thereof which are chemically modified in a polymer-homologous manner, such as cellulose acetates, cellulose propionates and cellulose butyrates, or the cellulose ethers, such as methylcellulose; rosins and their derivatives.

27. Mixtures of polymers as mentioned above, for example PP/EPDM, Polyamide 6/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPE/HIPS, PPE/PA 6.6 and copolymers, PA/HDPE, PA/PP, PA/PPE.

28. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellithates) and also mixtures of synthetic esters with mineral oils in any weight ratios, which materials may be used as plasticizer for polymers or as textile spinning oils, as well as aqueous emulsions of such materials.

29. Aqueous emulsions of natural or synthetic rubber, e.g. natural latex or latices of carboxylated styrene/butadiene copolymers.

The mixtures of the compounds (A) and (B) of the present invention are particularly suitable for improving the light stability, heat stability and oxidation stability of synthetic polymers, in particular polyolefins, especially polyethylene and polypropylene.

The compounds (A) and (B) can be used in mixtures with polymeric organic materials in various proportions depending on the nature of the material to be stabilised, on the end use and on the presence of other additives.

The percentages by weight, relative to the weight of the polymeric organic materials to be stabilised, of the compounds (A) and (B) are between 0.025 and 2%, preferably between 0.05 and 1%, for the compounds (A) and between 0.001 and 1%, preferably between 0.01 and 0.5%, for the compounds (B).

The compounds (A) and (B) can be mixed with one another before they are added to the polymeric organic materials or can be added separately, utilising any known procedures.

In general, the compounds (A) and (B) can be incorporated in the polymeric organic materials before, during or after the polymerisation or crosslinking of the said materials.

The compounds (A) and (B) can be incorporated in the polymeric organic materials in the pure form or encapsulated in waxes, oils or polymers, or in the form of solutions or suspensions and also in the form of a masterbatch; in such operations, the polymer can be used in the form of powder, granules, solutions, suspensions or in the form of latices.

The materials stabilised with the compounds (A) and (B) can be used for the production of mouldings, films, tapes, monofilaments, fibres, surface coatings and the like.

If desired, other conventional additives for polymeric organic materials, such as antioxidants, UV absorbers, nickel stabilisers, pigments, fillers, plasticisers, antistatic agents, flameproofing agents, lubricants, corrosion inhibitors and metal deactivators, can be added to the mixtures of the compounds (A) and (B) with the polymeric organic materials.

Particular examples of additives which can be used in admixture with the compounds (A) and (B) are:

1. Antioxidants 1.1. Alkylated monophenols, for example 2,6-di-tert-butyl-4-methyl-phenol, 2-tert-butyl-4,6-dimethylphenol, 2,6-di-tert-butyl-4-ethylphenol, 2,6-di-tert-butyl-4-n-butylphenol, 2,6-di-tert-butyl-4-iso-butylphenol, 2,6-dicyclopentyl-4-methylphenol, 2-($\alpha$-methylcyclohexyl)-4,6-dimethylphenol, 2,6-dioctadecyl-4-methylphenol, 2,4,6-tri-cyclohexyl-phenol, 2,6-di-tert-butyl-4-methoxymethylphenol, 2,6-di-nonyl-4-methylphenol, 2,4-dimethyl-6-(1'-methyl-undec-1'-yl)-phenol, 2,4-dimethyl-6-(1'-methyl-heptadec-1'-yl)-phenol, 2,4-dimethyl-6-(1'-methyl-tridec-1'-yl)-phenol and mixtures therof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxy-phenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl-stearate, bis-(3,5-di-tert-butyl-4-hydroxyphenyl)adipate.

1.4. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis-(2,6-dimethyl-4-hydroxyphenyl)-disulfide.

1.5. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-($\alpha$-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-($\alpha$-methylbenzyl)-4-nonylphenol], 2,2'-methylenebis[6-($\alpha,\alpha$-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butan, 2,2-bis-(3,5-di-tert.-butyl-4-hydroxyphenyl)-propan, 2,2-bis-(5-tert.-butyl-4-hydroxy-2-methylphenyl)-4-n-dodecylmercapto-butan, 1,1,5,5-tetra-(5-tert.-butyl-4-hydroxy-2-methylphenyl)-pentan.

1.6. O-, N- and S-benzyl compounds, for example 3,5,3',5'-tetra-tert.-butyl-4,4'-dihydroxydibenzylether, octadecyl-4-hydroxy-3,5-dimethylbenzyl-mercaptoacetate, tris-(3,5-di-tert.-butyl-4-hydroxybenzyl)-amine, bis-(4-tert.-butyl-3-hydroxy-2,6-dimethylbenzyl)dithioterephthalate, bis-(3,5-di-tert.-butyl-4-hydroxybenzyl)-sulfide, isooctyl-3,5-di-tert.-butyl-4-hydroxybenzylmercaptoacetate.

1.7. Hydroxybenzylated Malonates, for example dioctadecyl-2,2-bis-(3,5-di-tert.-butyl-2-hydroxybenzyl)-malonate, di-octadecyl-2-(3-tert.-butyl-4-hydroxy-5-methylbenzyl)-malonate, di-dodecylmercaptoethyl-2,2- bis-(3,5-di-tert.-butyl-4-hydroxybenzyl)-malonate, Di-[4-(1,1,3,3-tetramethylbutyl)-phenyl]2,2-bis-(3,5-di-tert.-butyl-4-hydroxybenzyl)-malonate.

1.8. Hydroxybenzyl-Aromatics, for example 1,3,5-tris-(3,5-di-tert.-butyl-4-hydroxybenzyl)-2,4,6-trimethylbenzene, 1,4-bis-(3,5-di-tert.-butyl-4-hydroxybenzyl)-2,3,5,6-tetramethylbenzene, 2,4,6-tris-(3,5-di-tert.-butyl-4-hydroxybenzyl)-phenol.

1.9. Triazine Compounds, for example 2,4-bis-octylmercapto-6-(3,5-di-tert.-butyl-4-hydroxyanilino)-1,3,5-triazine, 2-octylmercapto-4,6-bis-(3,5-di-tert.-butyl-4-hydroxyanilino)-1,3,5-triazine, 2-octylmercapto-4,6-bis-(3,5-di-tert.-butyl-4-hydroxyphenoxy) -1,3,5-triazine, 2,4,6-tris-(3,5-di-tert.-butyl-4-hydroxyphenoxy)-1,2,3-triazine, 1,3,5-tris-(3,5-di-tert.-butyl-4 -hydroxybenzyl)-isocyanurate, 1,3,5-tris-(4-tert.-butyl-3-hydroxy-2,6-di-methylbenzyl)-isocyanurate, 2,4,6-tris-(3,5-di-tert.-butyl-4-hydroxyphenylethyl)-1,3,5-triazine, 1,3,5-tris-(3,5-di-tert.butyl-4-hydroxyphenylpropionyl)-hexahydro-1,3,5-triazine, 1,3,5-tris-(3,5-dicyclohexyl-4-hydroxybenzyl)-isocyanurate.

1.10. Benzylphosphonates, for example dimethyl-2,5-di-tert.-butyl-4-hydroxybenzylphosphonate, diethyl-3,5-di-tert.-butyl-4-hydroxybenzylphosphonate, dioctadecyl-3,5-di-tert.-butyl-4-hydroxybenzylphosphonate, dioctadecyl-5-tert.-butyl-4-hydroxy-3-methylbenzylphosphonate, Ca-salt of the 3,5-di-tert.-butyl-4-hydroxybenzyl-phosphonic acid monoethylester.

1.11. Acylaminophenols, for example lauric acid 4-hydroxyanilide, stearic acid 4-hydroxyanilide, octyl N-(3,5-di-tert-butyl-4-hydroxyphenyl)-carbamate.

1.12. Esters of β-(3,5-di-tert-butyl-4-hydroxyphenyl)propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

1.13. Esters of β-(5-tert-butyl-4-hydroxy-3-methylphenyl)propionic acid with mono-or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

1.14 Esters of β-(3,5-dicyclohexyl-4-hydroxyphenyl)propionic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

1.15 Esters of 3,5-di-tert.-butyl-4-hydroxyphenyl acetic acid with mono- or polyhydric alcohols, e.g. with methanol, ethanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo-[2.2.2]-octane.

1.16. Amides of β-(3,5-di-tert-butyl-4-hydroxyphenyl)propionic acid e.g. N,N'-bis(3,5-di-tert-butyl-4 -hydroxyphenylpropionyl)hexamethylene-diamine, N,N'-bis(3,5-di-tert-butyl-4-hydroxyphenylpropionyl)trimethylene-diamine, N,N'-bis(3,5-di-tert-butyl-4-hydroxyphenylpropionyl)-hydrazine.

2. UV Absorbers and Light Stabilisers 2.1. 2-(2'-Hydroxyphenyl)benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5'-methyl, 3'-sec-butyl-5'-tert-butyl, 4'-octoxy, 3',5' -di-tert-amyl and 3',5'-bis(α,α-dimethylbenzyl), mixture of 5-chloro-3'-tert.-butyl-5'-(2-octyloxycarbonylethyl)- and 5-chloro-3'-tert.-butyl-5'-[2-(2-ethylhexyloxy)-carbonylethyl]-, 5-chloro-3'-tert.-butyl-5'-(2-methoxycarbonylethyl)-, 3'-tert.-butyl-5'-(2-methoxycarbonylethyl)-, 3'-tert.-butyl-5'-(2-octyloxycarbonylethyl)-, 3'-tert.-butyl-5'-[2 -(2-ethylhexyloxy)carbonylethyl]-, 3'-dodecyl-5'-methyl- and 3'-tert.-butyl-5'-(2-isooctyloxycarbonylethyl)-2' -hydroxyphenyl-2H-benztriazole(2), 2,2'-methylene-bis [4-(1,1,3,3-tetramethylbutyl)-6 -benztriazole-2-yl-phenol]; product of ester interchange of 2-[3'-tert.-butyl-5'-(2 -methoxycarbonylethyl)-2'-hydroxy-phenyl]-2H-benztriazole with polyethylene glycol 300; [R—CH$_2$CH$_2$—COO(CH$_2$)$_3$—]$_2$ with R=3'-tert.-butyl-4' -hydroxy-5'-2H-benzotriazole-2-yl-phenyl.

2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, as for example 4-tert.butylphenyl salicylate, phenyl salicylate, octylphenyl salicylate, dibenzoylresorcinol, bis-(4-tert.butylbenzoyl)-resorcinol, benzoylresorcinol, 2,4-di-tert.butylphenyl 3,5-di-tert.butyl-4-hydroxybenzoate, hexadecyl 3,5-di-tert.butyl-4-hydroxybenzoate, octadecyl 3,5-di-tert.-butyl-4-hydroxybenzoate, 2 methyl-4,6-di-tert.-butylphenyl 3,5-di-tert.-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of 4-hydroxy-3,5-di-tert-butylbenzyl-phosphonic acid monoalkyl esters, e.g. of the methyl or ethyl ester, nickel complexes of ketoximes, e.g. of 2-hydroxy-4-methyl-phenyl undecyl ketoxime, nickel complexes of 1-phenyl-4-lauroyl-5-hydroxypyrazole, with or without additional ligands.

2.6. Sterically hindered amines, for example bis(2,2,6,6- tetramethyl-piperidyl)sebacate, bis-(2,2,6,6-tetramethyl-piperidyl) succinate, bis(1,2,2,6,6-pentamethylpiperidyl)sebacate, bis(1,2,2,6,6-pentamethylpiperidyl) n-butyl-3,5-di-tert-butyl-4-hydroxy-benzylmalonate, the condensation product of 1-(2-hydroxyethyl)-2,2,6,6-tetramethyl-4-hydroxypiperidine and succinic acid, the condensation product of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butane-tetracarboxylate, 1,1'-(1,2-ethanediyl)bis-(3,3,5,5-tetramethylpiperazinone), 4-benzoyl-2,2,6,6-tetramethylpiperidine, 4-stearyloxy-2,2,6,6-tetramethylpiperidine, bis-(1,2,2,6,6-pentamethylpiperidyl)-2-n-butyl-2-(2-hydroxy-3,5-di-tert.-butylbenzyl) malonate, 3-n-octyl-7,7,9,9-tetramethyl-1,3,8-triazasprio[4.5]decan-2,4-dion, bis-(1-octyloxy-2,2,6,6-tetramethylpiperidyl) sebacate, bis-(1-octyloxy-2,2,6,6-tetramethylpiperidyl)succinate, product of condensation of N,N'-bis-(2,2,6,6-tetramethyl-4-piperidyl)-hexamethylene diamine and 4-morpholino-2,6-dichloro-1,3,5-triazine, product of condensation of-chloro-4,6-di-(4-n-butylamino-2,2,6,6-tetramethylpiperidyl)-1,3,5-triazine and 1,2-bis-(3-aminopropylamino)ethane, product of condensation of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5] decane-2,4-dion, 3-dodecyl-1-(2,2,6,6-tetramethyl-4-piperidyl)pyrrolidin-2,5-dion, 3-dodecyl-1-(1,2,2,6,6-pentamethyl-4-piperidyl)-pyrrolidin-2,5-dion.

2.7. Oxalic acid diamides, for example 4,4'-dioctyloxyoxanilide, 2,2'-dioctyloxy-5,5' -di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of ortho- and para-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4 -octyloxy-phenyl)-1,3,5-triazine, 2-(2-hydroxy-4-octyloxy-phenyl)-4,6-bis(2,4-dimethylphenyl)-1,3,5-triazine, 2-(2,4-dihydroxy-phenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2 -hydroxy-4-octyloxyphenyl)-4,6-bis(4-methylphenyl)-1,3,5-triazine, 2-(2-hydroxy-4 -dodecyloxyphenyl)-4,6-bis(2,4-dimethylphenyl)-1,3, 5-triazine, 2-[2-hydroxy-4-(2-hydroxy-3 -butyloxypropyloxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine.

3. Metal deactivators, for example N,N'-diphenyloxalic acid diamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyl-oy-lamino-1,2,4-triazole, bis(benzylidene)oxalodihydrazide, Oxanilide, isophthalic acid dihydrazide, sebacic acid-bis-phenylhydrazide, N,N'-diacetal-adipinic acid dihydrazide, N,N'-bis-salicyloyl-oxalic acid dihydrazide, N,N'-bis-salicyloyl-thiopropionic acid dihydrazide.

4. Phosphites and phosphonites, for example triphenyl phosphite, diphenyl alkyl phosphites, phenyl dialkyl phosphites, tris(nonylphenyl) phosphite, trilauryl phosphite, trioctadecyl phosphite, distearyl pentaerythritol diphosphite, tris(2,4-di-tert-butylphenyl) phosphite, diiso- decyl pentaerythritol diphosphite, bis(2,4-di-tert.-butylphenyl) pentaerythritol diphosphite, bis-(2,6-di-tert.-butyl-4-methylphenyl)-pentaerythritol diphosphite, bis-isodecyloxy-pentaerythritol diphosphite, bis-(2,4-di-tert.-butyl-6-methylphenyl)-pentaerythritol diphosphite, bis-(2,4,6-tri-tert.-butylphenyl)-pentaerythritol diphsophite, tristearyl sorbitol triphosphite, tetrakis(2,4-di-tert-butylphenyl) 4,4'-biphenylene diphosphonite, 6-isooctyloxy-2,4,8,10-tetra-tert.-butyl-12H-dibenz[d,g]-1,3,2-dioxaphosphocin, 6-fluoro-2,4, 8,10-tetra-tert.-butyl-12-methyl-dibenz[d,g]-1,3,2-dioxaphosphocin.

4a. Hydroxylamines, for example dibenzylhydroxylamine, dioctylhydroxylamine, didodecylhydroxylamine, ditetradecylhydroxylamine, dihexadecylhydroxylamine, dioctadecylhydroxylamine, 1-hydroxy-2, 2,6,6-tetramethyl-4-piperidyl benzoate or bis(1-hydroxy-2,2,6,6-tetramethyl-4-piperidyl) sebacate.

5. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecyl-mercapto)propionate.

6. Polyamide stabilisers, for example, copper salts in combination with iodides and/or phosphorus compounds and salts of divalent manganese.

7. Basic co-stabilisers, for example, melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids for example Ca stearate, Zn stearate, Mg behenate, Mg stearate, Na ricinoleate and K palmitate, antimony pyrocatecholate or zinc pyrocatecholate.

8. Nucleating agents, for example, 4-tert.butyl-benzoic acid, adipic acid, diphenylacetic acid.

9. Fillers and reinforcing agents, for example, calcium carbonate, silicates, glass fibres, asbestos, talc, kaolin, mica, barium sulfate, metal oxides and hydroxydes, carbon black, graphite.

10. Other additives, for example, plasticisers, lubricants, emulsifiers, pigments, optical brighteners, flameproofing agents, antistatic agents and blowing agents.

EXAMPLE 1

Preparation of the compound of the formula

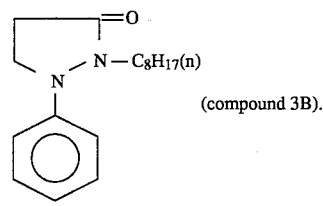

(compound 3B).

During 1 hour, 23.8 g (0.12 mol) of octyl bromide are added to a mixture containing 20 g (0.12 mol) of 1-phenyl-3-pyrazolidinone, 23 g (0.16 mol) of anhydrous potassium carbonate in 100 ml of dimethylformamide heated at 60° C.

Then, the mixture is stirred at 60° C. for 1 hour and subsequently diluted with 500 ml of water and 300 ml of n-hexane.

The organic phase is separated off, washed with water and then treated with 50 g of ®Silicagel 60 (230–400 mesh).

After filtration, the product is extracted from silicagel by acetone which is evaporated under vacuum.

The residue is distilled and a product having a boiling point of 158° C. (0.1 mmHg) is obtained.

Elemental analysis for $C_{17}H_{26}N_2O$: Calculated: C=74.4%; H=9.5%; N=10.2%. Found: C=73.6%; H=9.4%; N=10.12%.

EXAMPLES 2–5

Following the procedure described in Example 1 and using the appropriate halide and the appropriate starting material, the products listed in Table 1 are prepared.

EXAMPLE 6

Preparation of the compound of the formula

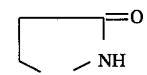
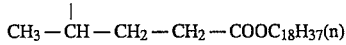

(compound 5B).

TABLE 1

| Starting material | Product | m.p.(°C.) |
|---|---|---|
| (compound 1B) | (compound 6B) | 194–196 |
| (compound 7B) | (compound 8B) | 61–62 |
| (compound 10B) | (compound 11B) | 129–131 |
| (compound 16B) | (compound 17B) | 70–73 |

I) Synthesis of the intermediate of the formula

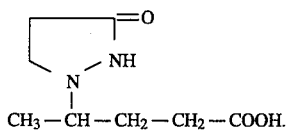

62.8 c, (0.73 mol) of 3-pyrazolidinone and 85.4 g (0.73 mol) of levulinic acid in 250 ml of methanol are heated at 45° C. for 1 hour. After cooling to room temperature, the precipitate is filtered off and washed with methanol.

Then, the solid is dissolved in 400 ml of a 1:1 mixture of water and methanol; 10 g of Pt (5% on carbon, containing 50% of water) are added and hydrogenation is carried out at room temperature and 2 bar. Subsequently, the catalyst is removed, the solvent is evaporated and the residue is crystallized from isopropanol.

II) 32 g (0.15 mol) of the compound obtained according to I) are dissolved in 150 ml of toluene, 49 g (0.17 mol) of stearyl alcohol and 0.3 g of dibutyltin oxide are added and the mixture is heated under reflux for 8 hours, separating off the water of reaction by azeotropic distillation.

After the reaction is finished, the mixture is washed with water, the toluene is distilled off and the residue is crystallized from n-octane.

The product obtained has a melting point of 54°–57° C.

Elemental analysis for $C_{26}H_{50}N_2O_3$: Calculated: C=71.2%; H=11.49%; N=6.39%. Found: C=71.1%; H=11.36%; N=6.36%.

The use of the stabiliser mixtures according to the present invention is demonstrated in the examples which follow; these are given solely for illustrative purposes and do not imply any restriction.

EXAMPLES 7–12

1000 g of polypropylene powder of melt index=2 g/10 minutes (measured at 230° C. and 2.16 kg) and 1 g of calcium stearate are mixed in a slow mixer with the compounds (A) and (B) indicated in Table 2.

The mixtures are extruded at 200°–220° C. to give polymer granules which are then converted into stretched tapes of 50 μm thickness and 2.5 mm width, using a pilot-type apparatus (®Leonard-Sumirago (VA) Italy) operating under the following conditions:
Extruder temperature: 210°–230° C.
Head temperature: 240°–260° C.
Stretch ratio: 1:6

The tapes thus prepared are exposed, mounted on a white card, in a model 65 WR Weather-O-Meter (ASTM G 2565-85) with a black panel temperature of 63° C. The residual tenacity is measured on samples taken after various times of exposure to light by means of a constant-speed tensometer. The exposure time (in hours) ($T_{50}$) needed to halve the initial tenacity is then calculated.

Tapes prepared under the same conditions as indicated above, but without the addition of stabilisers and, moreover, with the use of the compounds (A) and (B) individually, are exposed for comparison.

In comparison 2 and 4, 0.5 g of pentaerythritol tetrakis [3-(3,5-di-tert-butyl-4-hydroxyphenyl)-propionate] and 1.0 g of tris(2,4-di-tert-butylphenyl)-phosphite are added in order to ensure process stabilisation.

The results obtained are shown in Table 2.

TABLE 2

| Example No | compound (A)(g) | compound (B)(g) | $T_{50}$(hours) |
|---|---|---|---|
| comparison 1 | — | — | 540 |
| comparison 2 | 4A(1) | — | 2650 |
| comparison 3 | — | 7B(1) | 270 |
| comparison 4 | 16A(1) | — | 2700 |
| comparison 5 | — | 16B(1) | 320 |
| 7 | 4A(1) | 7B(1) | 4200 |
| 8 | 4A(1) | 8B(1) | 4200 |
| 9 | 4A(1) | 16B(1) | 4000 |
| 10 | 16A(1) | 16B(1) | 3400 |
| 11 | 4A(1) | 7B(0.3) | 4400 |
| 12 | 4A(1) | 1B(0.5) | 4400 |

Components A) and B) of the instant stabilizer compositions as well as the instant stabilizer compositions, themselves, can additionally be used for stabilizing almost all materials known in the art of photographic reproduction and other reproduction techniques as e.g. described in Research Disclosure 1990, 31429 (pages 474 to 480).

What is claimed is:

1. A stabiliser composition comprising:

A) one or more compounds containing groups of the formulae (Ia)–(Ic)

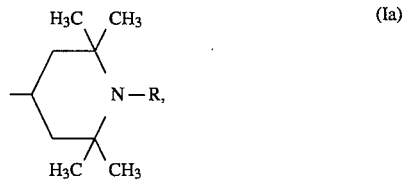

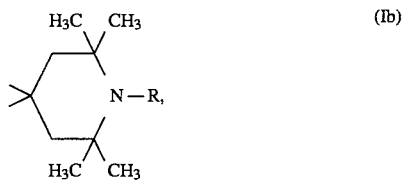

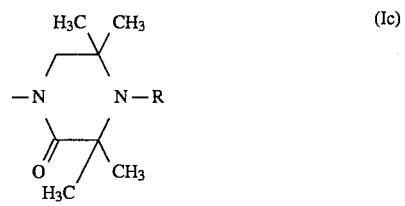

in which R is hydrogen, $C_1$–$C_4$alkyl, O, OH, $C_1$–$C_{12}$alkoxy, $C_5$–$C_8$cycloalkoxy, $C_3$–$C_6$alkenyl, $C_7$–$C_9$phenylalkyl which is unsubstituted or mono-, di- or tri-substituted on the phenyl by $C_1$–$C_4$alkyl; or $C_1$–$C_8$acyl; and B) one or more derivatives of 3-pyrazolidinone or of 1,2,4-triazolidine-3,5-dione substituted in the 1-position.

2. A stabiliser composition according to claim 1, comprising:

A) one or more compounds of the formulae (IIa)–(IId)

a group of the formula (IV)

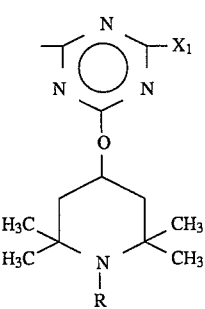
(IV)

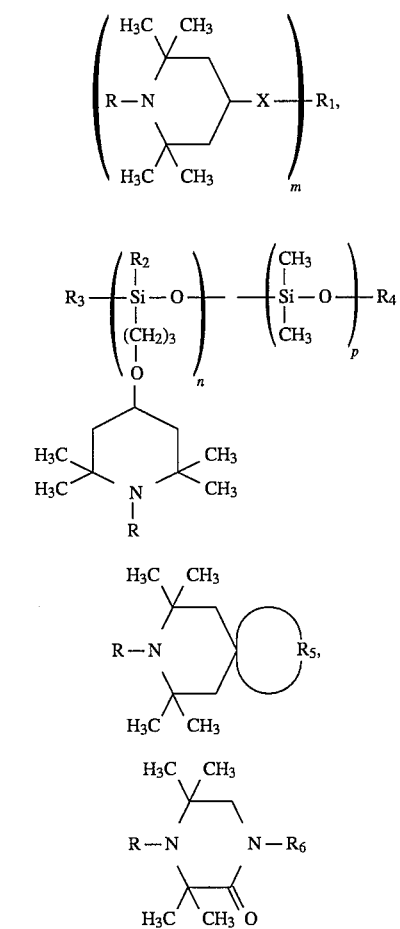
(IIa)
(IIb)
(IIc)
(IId)

in which $X_1$ is a group $-OR_9$ or

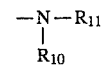

where $R_9$, $R_{10}$ and $R_{11}$ which may be identical or different are as defined above for $R_7$ or $C_3$–$C_{18}$alkenyl, or the group

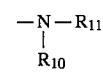

is a 5- to 7-membered heterocyclic group or $X_1$ is also a group of the formula (V)

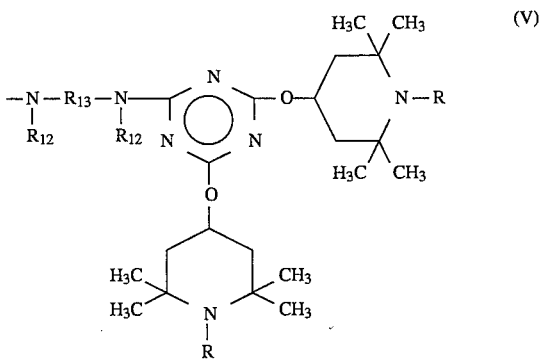
(V)

in which X is —O— or

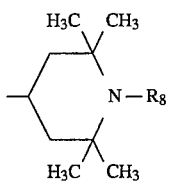

where $R_7$ is hydrogen, $C_1$–$C_{18}$alkyl, $C_5$–$C_{12}$cycloalkyl which is unsubstituted or mono-, di- or tri-substituted by $C_1$–$C_4$alkyl; $C_7$–$C_9$phenylalkyl which is unsubstituted or mono-, di- or tri-substituted on the phenyl by $C_1$–$C_4$alkyl; or a group of the formula (III)

(III)

in which $R_8$ is as defined for R, m is 1, 2, 3 or 4 and, when m is 1, $R_1$ is aliphatic, cycloaliphatic, aromatic, arylaliphatic or heterocyclic acyl containing not more than 22 carbon atoms or, when X is —O—, $R_1$ is also where $R_{12}$ is $C_1$–$C_{18}$alkyl, $C_5$–$C_{12}$cycloalkyl which is unsubstituted or mono-, di- or tri-substituted by $C_1$–$C_4$alkyl; $C_7$–$C_9$phenylalkyl which is unsubstituted or mono-, di- or tri-substituted on the phenyl by $C_1$–$C_4$alkyl; or a group of the formula (III) and $R_{13}$ is $C_2$–$C_{12}$alkylene, cyclohexylene, cyclohexylenedimethylene, methylenedicyclohexylene, xylylene or $C_4$–$C_{12}$alkylene interrupted by 1, 2 or 3 oxygen atoms or by 1, 2 or 3

groups where $R_{14}$ is a group of the formula (VI)

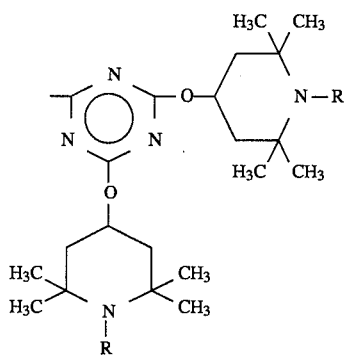 (VI)

or the group

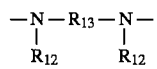

is a group of the formula (VII)

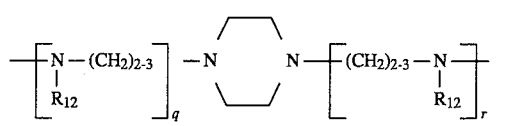 (VII)

where $R_{12}$ is as defined above and q and r which can be identical or different are zero or 1, or the group —X—$R_1$ is also one of the groups of the formulae (VIIIa)–(VIIIe)

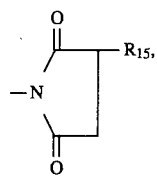 (VIIIa)

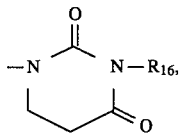 (VIIIb)

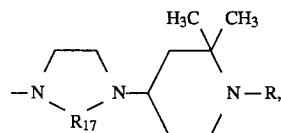 (VIIIc)

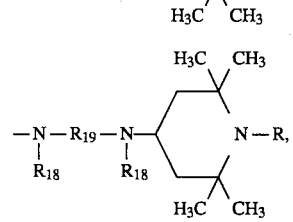 (VIIId)

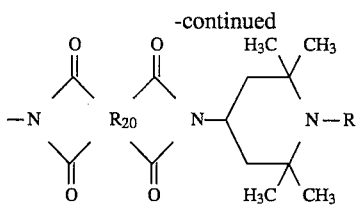 (VIIIe)

in which $R_{15}$ is $C_1$–$C_{18}$alkyl or $C_3$–$C_{18}$alkenyl, $R_{16}$ is as defined above for $R_{12}$ or phenyl or a group of the formula (IX)

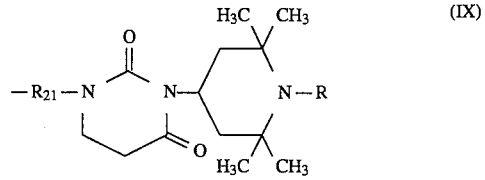 (IX)

where $R_{21}$ is $C_2$–$C_{12}$alkylene, cyclohexylene, cyclohexylenedimethylene, methylenedicyclohexylene, a group

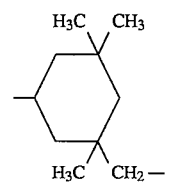, phenylene, methylphenylene, xylylene, methylenediphenylene or oxydiphenylene, $R_{17}$ is $C_1$–$C_{12}$alkylidene, benzylidene, carbonyl, oxalyl, malonyl, ethylene or a group —$CH_2CO$—, $R_{18}$ is $C_1$–$C_8$acyl or ($C_1$–$C_8$alkoxy)carbonyl, $R_{19}$ is $C_2$–$C_{12}$alkylene, cyclohexylene, cyclohexylenedimethylene, methylenedicyclohexylene, xylylene or $C_4$–$C_{12}$alkylene interrupted by 1, 2 or 3 oxygen atoms or by 1, 2 or 3

groups with $R_{18}$ being as defined above, and $R_{20}$ is one of the groups

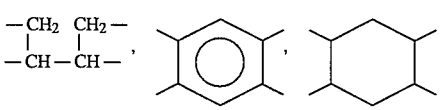

and when m is 2, $R_1$ is $C_2$–$C_{12}$alkylene, $C_4$–$C_{12}$alkylene interrupted by 1, 2 or 3 oxygen atoms; cyclohexylene, cyclohexylenedimethylene, methylenedicyclohexylene, xylylene, a group —$CH_2CO$— or

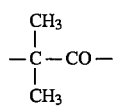

or aliphatic, cycloaliphatic, aromatic, arylaliphatic or heterocyclic diacyl containing not more than 22 carbon atoms, and, when m is 3, $R_1$ is aliphatic, aromatic or heterocyclic triacyl having not more than 18 carbon atoms, and, when m is 4, $R_1$ is aliphatic or aromatic tetraacyl having not more than 18 carbon atoms; $R_2$ is $C_1$–$C_4$alkyl, $C_1$–$C_4$alkoxy or OH, n is a number from 1 to 50, p is a number from 0 to 30, $R_3$ is OH, $C_1$–$C_4$alkoxy or a group $(CH_3)_3SiO-$, $R_4$ is hydrogen, $C_1$–$C_4$ alkyl or a group $(CH_3)_3Si-$, and, when n+p is a number from 3 to 10, $R_3$ and $R_4$ also form a direct bond, $R_5$ is one of the groups of the formulae (Xa)–(Xc)

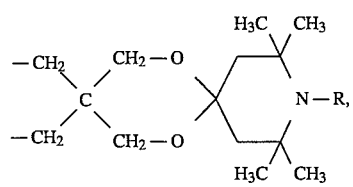

in which $R_{22}$, $R_{25}$ and $R_{26}$ which can be identical or different are as defined above for $R_7$; $R_{23}$ and $R_{24}$ which can be identical or different am $C_1$–$C_{18}$alkyl or $R_{23}$ and $R_{24}$, together with the carbon atom to which they are bound, are a $C_5$–$C_{12}$cycloalkylidene group, and $R_{27}$ is one of the groups of the formulae (XIa)–(XIf)

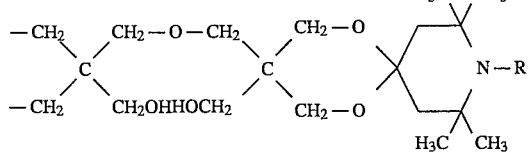

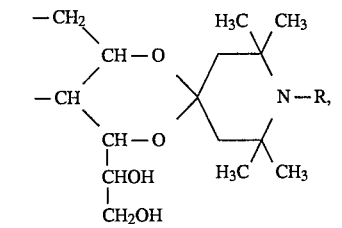

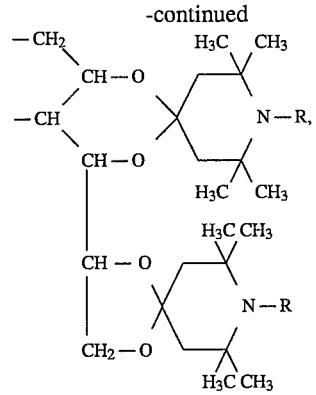

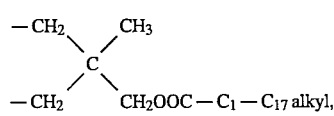

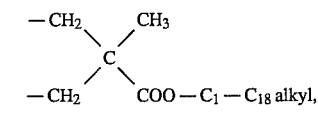

$R_6$ is a group of the formula (XIIa) or (XIIb)

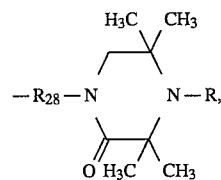

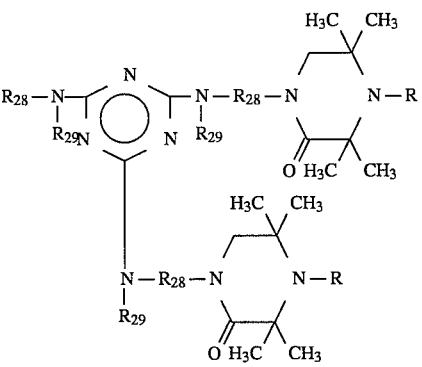

in which $R_{28}$ is $C_2$–$C_{12}$alkylene and $R_{29}$ is as defined above for $R_7$; and B) one or more compounds of the formulae (XIIIa)–(XIIIc)

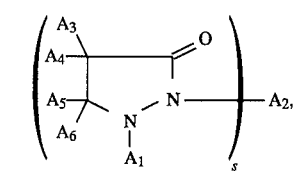 (XIIIa)

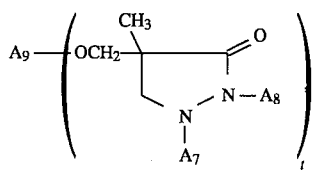 (XIIIb)

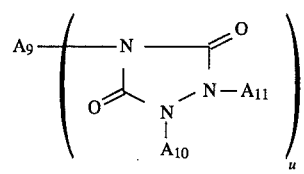 (XIIIc)

in which $A_1$ is $C_1$–$C_8$alkyl, $C_5$–$C_{12}$cycloalkyl which is unsubstituted or mono-, di- or tri-substituted by $C_1$–$C_4$alkyl; phenyl which is unsubstituted or mono-, di- or tri-substituted by $C_1$–$C_4$alkyl or $C_1$–$C_4$alkoxy and/or monosubstituted by an OH group; phenylalkyl which is unsubstituted or mono-, di- or tri-substituted on the phenyl by $C_1$–$C_4$alkyl and/or monosubstituted by an OH group; a group —$A_{13}$—COO$A_{14}$ where $A_{13}$ is $C_1$–$C_6$alkylene and $A_{14}$ is $C_1$–$C_{18}$alkyl, $C_5$–$C_{12}$cycloalkyl which is unsubstituted or mono-, di- or tri-substituted by $C_1$–$C_4$alkyl; $C_3$–$C_{18}$alkenyl or $C_7$–$C_9$phenylalkyl which is unsubstituted or mono-, di- or tri-substituted on the phenyl by $C_1$–$C_4$alkyl; $A_3$, $A_4$, $A_5$ and $A_6$ which can be identical or different are hydrogen, $C_1$–$C_4$alkyl or phenyl, and s is 1 or 2, and, when s is 1, $A_2$ is hydrogen, $C_1$–$C_{18}$alkyl, $C_3$–$C_6$alkenyl or $C_7$–$C_9$phenylalkyl which is unsubstituted or mono-, di- or tri-substituted on the phenyl by $C_1$–$C_4$alkyl; or a group —$A_{13}$—COO$A_{14}$ as defined above, and, when $A_2$ is hydrogen, $A_1$ can also be a group of the formula (XIV)

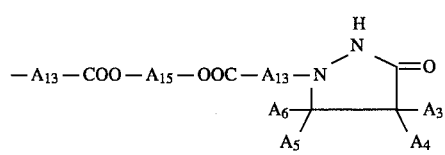 (XIV)

where $A_3$, $A_4$, $A_5$, $A_6$ and $A_{13}$ are as defined above and $A_{15}$ is $C_2$–$C_{12}$alkylene, $C_4$–$C_{12}$alkylene interrupted by 1, 2 or 3 oxygen atoms; cyclohexylene, cyclohexylenedimethylene or isopropylidenedicyclohexylene, and, when s is 2, $A_2$ is $C_2$–$C_{12}$alkylene or xylylene, $A_7$ is phenyl which is unsubstituted or mono-, di- or tri-substituted by $C_1$–$C_4$alkyl or $C_1$–$C_4$alkoxy and/or monosubstituted by an OH group; $A_8$ is hydrogen, $C_1$–$C_{18}$alkyl, $C_3$–$C_6$alkenyl, $C_7$–$C_9$phenylalkyl which is unsubstituted or mono-, di- or tri-substituted on the phenyl by $C_1$–$C_4$alkyl; or a group —$A_{13}$—COO$A_{14}$ as defined above, t is 1, 2, 3 or 4, and, when t is 1, $A_9$ is aliphatic, cycloaliphatic, aromatic, arylaliphatic or heterocyclic acyl containing not more than 22 carbon atoms, or one of the groups of the formulae (XVa)–(XVc)

 (XVa)

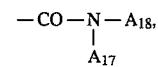 (XVb)

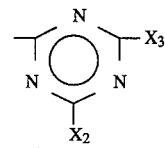 (XVc)

in which $A_{16}$ is as defined above for $A_{14}$; $A_{17}$ and $A_{18}$ which can be identical or different are as defined above for $A_{14}$ or are hydrogen or phenyl or the group

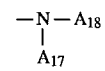

is a 5- to 7-membered heterocyclic group, $X_2$ and $X_3$ which can be identical or different are a group —O—$A_{19}$ or

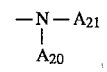

where $A_{19}$, $A_{20}$ and $A_{21}$ which can be identical or different are as defined above for $A_{17}$ and $A_{18}$, and, when t is 2, $A_9$ is carbonyl, aliphatic, cycloaliphatic, aromatic or heterocyclic diacyl containing not more than 22 carbon atoms, or a group of the formulae (XVIa)–(XVIc)

 (XVIa)

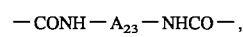 (XVIb)

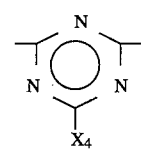 (XVIc)

in which $A_{22}$ is $C_2$–$C_{12}$alkylene, $C_4$–$C_{12}$alkylene interrupted by 1, 2 or 3 oxygen atoms; cyclohexylene, cyclohexylenedimethylene, isopropylidenedicyclohexylene, phenylene, xylylene or isopropylidenediphenylene, $A_{23}$ is as defined above for $R_{21}$ and $X_4$ is as defined above for $X_2$ and $X_3$, and, when t is 3, $A_9$ is aliphatic, aromatic or heterocyclic triacyl containing not more than 18 carbon atoms, or 1,3,5-triazine-2,4, 6-triyl, and, when t is 4, $A_9$ is aliphatic or aromatic tetraacyl containing not more than 18 carbon atoms, $A_{10}$ is $C_1$–$C_{18}$alkyl, $C_5$–$C_{12}$cycloalkyl which is unsubstituted or mono-, di- or tri-substituted by $C_1$–$C_4$alkyl; $C_3$–$C_{18}$alkenyl, phenyl which is unsubstituted or mono-, di- or tri-substituted by $C_1$–$C_4$alkyl or $C_1$–$C_4$alkoxy and/or monosubstituted by an OH group; $C_7$–$C_9$phenylalkyl which is unsubstituted or mono-, di- or tri-substituted on the phenyl by $C_1$–$C_4$alkyl and/or monosubstituted by an OH group; $A_{11}$ is as defined above for $A_8$, u is 1, 2 or 3, and, when u is 1, $A_{12}$ is as defined for $A_{10}$ or is a group

where $A_{24}$ and $A_{25}$ which can be identical or different are as defined for $A_{10}$ or $A_{24}$ is also hydrogen or aliphatic, cycloaliphatic or aromatic, arylaliphatic or heterocyclic acyl containing not more than 22 carbon atoms or a group —$COOA_{26}$ with $A_{26}$ as defined above for $A_{14}$, and, when u is 2, $A_{12}$ is as defined above for $R_{21}$ or is a group of the formula (XVIIa) or (XVIIb)

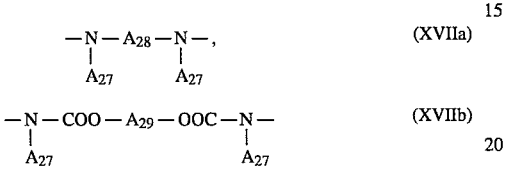

in which $A_{27}$ is as defined for $A_{10}$, $A_{28}$ is aliphatic, cycloaliphatic, aromatic or heterocyclic diacyl containing not more than 22 carbon atoms and $A_{29}$ is as defined above for $A_{15}$, and, when u is 3, $A_{12}$ is a group of the formula (XVIII)

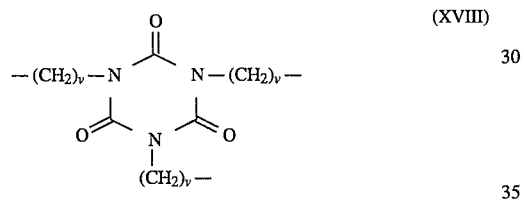

in which v is an integer from 2 to 6.

3. A stabiliser composition according to claim 1, comprising:

A) one or more compounds of the formula (IIa)–(IId) in which R is hydrogen, methyl, OH, $C_6$–$C_9$alkoxy, $C_5$–$C_7$cycloalkoxy, allyl, benzyl or acetyl, X is —O— or

where $R_7$ is hydrogen, $C_1$–$C_{12}$alkyl, $C_5$–$C_8$cycloalkyl which is unsubstituted or mono-, di- or tri-substituted by $C_1$–$C_4$alkyl; benzyl which is unsubstituted or mono-, di- or tri-substituted on the phenyl by $C_1$–$C_4$alkyl; or a group of the formula (III) in which $R_8$ is as defined for R, m is 1, 2, 3 or 4 and, when m is 1, $R_1$ is aliphatic $C_2$–$C_{22}$acyl, cycloaliphatic $C_7$–$C_{15}$acyl, aromatic $C_7$–$C_{15}$acyl, arylaliphatic $C_8$–$C_{20}$acyl or heterocyclic $C_5$–$C_{15}$acyl or, when X is —O—, $R_1$ is also a group of the formula (IV) in which $X_1$ is a group —$OR_9$ or

where $R_9$, $R_{10}$ and $R_{11}$ which can be identical or different are as defined above for $R_7$ or $C_3$–$C_{12}$alkenyl, or the group

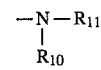

is 1-pyrrolidyl, 1-piperidyl, 4-morpholinyl or 1-hexahydroazepinyl, or $X_1$ is also a group of the formula (V) where $R_{12}$ is $C_1$–$C_{12}$alkyl, $C_5$–$C_8$cycloalkyl which is unsubstituted or mono-, di- or tri-substituted by $C_1$–$C_4$alkyl; benzyl which is unsubstituted or mono-, di- or tri-substituted on the phenyl by $C_1$–$C_4$alkyl; or a group of the formula (III), and $R_{13}$ is $C_2$–$C_{10}$alkylene, cyclohexylenedimethylene, methylenedicyclohexylene, xylylene or $C_4$–$C_{10}$alkylene interrupted by 1, 2 or 3 oxygen atoms or by 1, 2 or 3

groups where $R_{14}$ is a group of the formula (VI) or the group

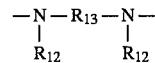

is a group of the formula (VII) in which q and r which can be identical or different are zero or 1, or the group —$X$—$R_1$ is also one of the groups of the formulae (VIIIa)–(VIIIe) in which $R_{15}$ is $C_1$–$C_8$alkyl or $C_3$–$C_{18}$alkenyl, $R_{16}$ is as defined above for $R_{12}$ or a group of the formula (IX) where $R_{21}$ is $C_2$–$C_{10}$alkylene, cyclohexylenedimethylene, methylenedicyclohexylene, the group

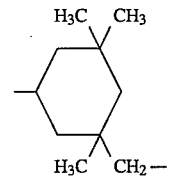

phenylene, methylphenylene, methylenediphenylene or oxydiphenylene, $R_{17}$ is $C_1$–$C_8$alkylidene, carbonyl, oxalyl, malonyl, ethylene or a group —$CH_2CO$—, $R_{18}$ is $C_1$–$C_6$acyl or ($C_1$–$C_6$alkoxy)carbonyl, $R_{19}$ is $C_2$–$C_{10}$alkylene, cyclohexylenedimethylene, methylenedicyclohexylene, xylylene or $C_4$–$C_{10}$alkylene interrupted by 1, 2 or 3 oxygen atoms or by 1, 2 or 3

groups with $R_{18}$ being as defined above, and $R_{20}$ is a group

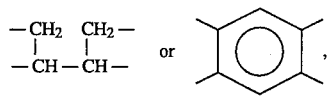

and, when me is 2, $R_1$ is $C_2$–$C_{10}$alkylene, $C_4$–$C_{10}$alkylene interrupted by 1, 2 or 3 oxygen atoms; cyclohexylenedimethylene, methylenedicyclohexylene, xylylene, a group —$CH_2CO$— or

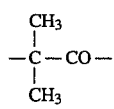

or aliphatic $C_2$–$C_{14}$diacyl, cycloaliphatic $C_8$–$C_{14}$diacyl, aromatic $C_8$–$C_{14}$diacyl, arylaliphatic $C_9$–$C_{22}$diacyl or heterocyclic $C_6$–$C_{18}$diacyl, and, when m is 3, $R_1$ is aliphatic $C_4$–$C_{15}$triacyl, aromatic $C_9$–$C_{12}$triacyl or heterocyclic $C_7$–$C_{12}$triacyl, and, when m is 4, $R_1$ is aliphatic $C_6$–$C_{12}$tetraacyl or aromatic $C_{10}$–$C_{12}$tetraacyl; $R_2$ is $C_1$–$C_3$alkyl, $C_1$–$C_3$alkoxy or OH, n is a number from 5 to 50, p is a number from zero to 25, $R_3$ is OH, $C_1$–$C_3$alkoxy or a group $(CH_3)_3SiO$—, $R_4$ is hydrogen, $C_1$–$C_3$alkyl or a group $(CH_3)_3Si$—, and, when n+p is a number from 3 to 10, $R_3$ and $R_4$ also form a direct bond, $R_5$ is one of the groups of the formulae (Xa)–(Xc) in which $R_{22}$, $R_{25}$ and $R_{26}$ which can be identical or different are hydrogen, $C_1$–$C_{18}$alkyl, $C_5$–$C_8$cycloalkyl which is unsubstituted or mono-, di- or tri-substituted by $C_1$–$C_4$alkyl; or benzyl which is unsubstituted or mono-, di- or tri-substituted on the phenyl by $C_1$–$C_4$alkyl; $R_{23}$ and $R_{24}$ which can be identical or different are $C_1$–$C_{12}$alkyl or $R_{23}$ and $R_{24}$, together with the carbon atom to which they are linked, are a $C_6$–$C_{12}$cycloalkylidene group, and $R_{27}$ is one of the groups of the formulae (XIa)–(XIf), and $R_6$ is a group of the formula (XIIa) or (XIIb) in which $R_{28}$ is $C_2$–$C_{10}$alkylene and $R_{29}$ is as defined above for $R_7$; and B) one or more compounds of the formulae (XIIIa)–(XIIIc) in which $A_1$ is $C_1$–$C_{12}$alkyl, $C_5$–$C_8$cycloalkyl which is unsubstituted or mono-, di- or tri-substituted by $C_1$–$C_4$alkyl; phenyl which is unsubstituted or mono-, di- or tri-substituted by $C_1$–$C_4$alkyl or $C_1$–$C_4$alkoxy; benzyl which is unsubstituted or mono-, di- or tri-substituted on the phenyl by $C_1$–$C_4$alkyl; or a group —$A_{13}$—$COOA_{14}$ where $A_{13}$ is $C_1$–$C_5$alkylene and $A_{14}$ is $C_1$–$C_{18}$alkyl, $C_5$–$C_8$cycloalkyl which is unsubstituted or mono-, di- or tri-substituted by $C_1$–$C_4$alkyl; allyl, undecenyl, oleyl or benzyl which is unsubstituted or mono-, di- or tri-substituted on the phenyl by $C_1$–$C_4$alkyl; $A_3$, $A_4$, $A_5$ and $A_6$ which can be identical or different are hydrogen or methyl, s is 1 or 2, and, when s is 1, $A_2$ is hydrogen, $C_1$–$C_{18}$alkyl, allyl, benzyl which is unsubstituted or mono-, di- or tri-substituted on the phenyl by $C_1$–$C_4$alkyl; or a group —$A_{13}$—$COOA_{14}$ as defined above, and, when $A_2$ is hydrogen, $A_1$ can also be a group of the formula (XIV) where $A_{15}$ is $C_2$–$C_{10}$alkylene, $C_4$–$C_{10}$alkylene interrupted by 1, 2 or 3 oxygen atoms; cyclohexylenedimethylene or isopropylidenedicyclohexylene, and, when s is 2, $A_2$ is $C_2$–$C_{10}$alkylene or xylylene, $A_7$ is phenyl which is unsubstituted or mono-, di- or tri-substituted by $C_1$–$C_4$alkyl or $C_1$–$C_4$alkoxy; $A_8$ is hydrogen, $C_1$–$C_{12}$alkyl, allyl, benzyl which is unsubstituted or mono-, di- or tri-substituted on the phenyl by $C_1$–$C_4$alkyl; or a group —$A_{13}$COOA_{14}$ as defined above, t is 1, 2, 3 or 4, and, when t is 1, $A_9$ is aliphatic $C_2$–$C_{22}$acyl, cycloaliphatic $C_7$–$C_{15}$acyl, aromatic $C_7$–$C_{15}$acyl or arylaliphatic $C_8$–$C_{20}$acyl or one of the groups of the formulae (XVa)–(XVc) in which $A_{16}$ is as defined above for $A_{14}$, and $A_{17}$ and $A_{18}$ which can be identical or different are as defined above for $A_{14}$ or are hydrogen or phenyl, or the group

is 1-pyrrolidyl, 1-piperidyl, 4-morpholinyl or 1-hexahydroazepinyl, $X_2$ and $X_3$ which can be identical or different are a group —$OA_{19}$ or

where $A_{19}$, $A_{20}$ and $A_{21}$ which can be identical or different are as defined above for $A_{17}$ and $A_{18}$, and, when t is 2, $A_9$ is aliphatic $C_2$–$C_{14}$diacyl, cycloaliphatic $C_8$–$C_{14}$diacyl, aromatic $C_8$–$C_{14}$diacyl or arylaliphatic $C_9$–$C_{22}$diacyl or a group of the formulae (XVIa)–(XVIc) in which $A_{22}$ is $C_2$–$C_{10}$alkylene, $C_4$–$C_{10}$alkylene interrupted by 1, 2 or 3 oxygen atoms; cyclohexylenedimethylene, isopropylidenedicyclohexylene, phenylene or isopropylidenediphenylene, $A_{23}$ is as defined above for $R_{21}$, and $X_4$ is as defined above for $X_2$ and $X_3$, and, when t is 3, $A_9$ is aliphatic $C_4$–$C_{15}$triacyl or aromatic $C_9$–$C_{12}$ triacyl or is 1,3,5-triazine-2,4,6-triyl and, when t is 4, $A_9$ is aliphatic $C_6$–$C_{12}$tetraacyl or aromatic $C_{10}$–$C_{12}$tetraacyl, $A_{10}$ is $C_1$–$C_{12}$alkyl, $C_5$–$C_8$cycloalkyl which is unsubstituted or mono-, di- or tri-substituted by $C_1$–$C_4$alkyl; $C_3$–$C_{12}$alkenyl, phenyl which is unsubstituted or mono-, di- or tri-substituted by $C_1$–$C_4$alkyl or $C_1$–$C_4$alkoxy; benzyl which is unsubstituted or mono-, di- or trisubstituted on the phenyl by $C_1$–$C_4$alkyl and/or monosubstituted by an OH group; $A_{11}$ is as defined above for $A_8$, u is 1, 2 or 3, and, when u is 1, $A_{12}$ is as defined for $A_{10}$ or is a group

where $A_{24}$ and $A_{25}$ which can be identical or different are as defined for $A_{10}$ or $A_{24}$ is also hydrogen or aliphatic $C_2$–$C_{22}$acyl, cycloaliphatic $C_7$–$C_{15}$acyl, aromatic $C_7$–$C_{15}$acyl or arylaliphatic $C_8$–$C_{20}$acyl or a group —$COOA_{26}$ with $A_{26}$ being as defined above for $A_{14}$, and, when u is 2, $A_{12}$ is as defined above for $R_{21}$ or is a group of the formula (XVIIa) or (XVIIb) in which $A_{27}$ is as defined for $A_{10}$; $A_{28}$ is aliphatic $C_2$–$C_{14}$diacyl, cycloaliphatic $C_8$–$C_{14}$diacyl, aromatic $C_8$–$C_{14}$diacyl or arylaliphatic $C_9$–$C_{22}$diacyl and $A_{29}$ is as defined above for $A_{15}$, and, when u is 3, $A_{12}$ is a group of the formula (XVIII) in which v is an integer from 4 to 6.

4. Stabiliser composition according to claim 1, comprising:

A) one or more compounds of the formulae (IIa)–(IId) in which R is hydrogen, methyl, $C_6$–$C_8$alkoxy, cyclohexoxy, allyl, benzyl or acetyl, X is —O— or

where $R_7$ is hydrogen, $C_1$–$C_{10}$alkyl, cyclohexyl which is unsubstituted or mono-, di- or tri-substituted by $C_1C_4$alkyl; benzyl or a group of the formula (III) in which $R_8$ is as defined for R, m is 1, 2, 3 or 4 and, when m is 1, $R_1$ is aliphatic $C_4$–$C_{22}$acyl, cycloaliphatic $C_7$–$C_{12}$acyl, aromatic $C_7$–$C_{12}$acyl, arylaliphatic $C_8$–$C_{18}$acyl or heterocyclic $C_5$–$C_{14}$acyl or, when X is —O—, $R_1$ is also a group of the formula (IV) in which $X_1$ is a group —$OR_9$ or

where $R_9$, $R_{10}$ and $R_{11}$ which can be identical or different are as defined above for $R_7$ or $C_3$–$C_{11}$alkenyl, or the group

is 4-morpholinyl, or $X_1$ is also a group of the formula (V) where $R_{12}$ is $C_1$–$C_{10}$alkyl, cyclohexyl which is unsubstituted or mono-, di- or tri-substituted by $C_1$–$C_4$alkyl; benzyl or a group of the formula (III) and $R_{13}$ is $C_2$–$C_8$alkylene, cyclohexylenedimethylene, methylenedicyclohexylene or $C_4$–$C_{10}$alkylene interrupted by 1, 2 or 3 oxygen atoms or by 1 or 2 groups

where $R_{14}$ is a group of the formula (VI), or the group

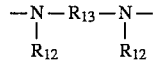

is 1,4-piperazinediyl or one of the groups

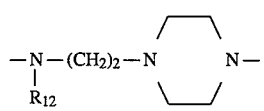

or

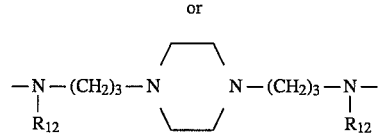

with $R_{12}$ being as defined above, or the group —X—$R_1$ is also one of the groups of the formulae (VIIIa)–(VIIIe) in which $R_{15}$ is $C_4$–$C_{18}$alkyl or $C_4$–$C_{18}$alkenyl, $R_{16}$ is as defined above for $R_{12}$ or a group of the formula (IX) where $R_{21}$ is $C_4$–$C_{10}$alkylene, cyclohexylenedimethylene, methylenedicyclohexylene, a group

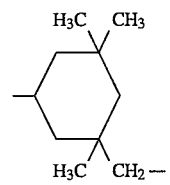

methylphenylene, methylenediphenylene or oxydiphenylene, $R_{17}$ is $C_1$–$C_4$alkylidene, carbonyl, oxalyl, ethylene or a group —$CH_2CO$—, $R_{18}$ is $C_1$–$C_4$acyl or ($C_1$–$C_4$alkoxy)-carbonyl, $R_{19}$ is $C_2$–$C_8$alkylene, cyclohexylenedimethylene, methylenedicyclohexylene or $C_4$–$C_{10}$alkylene interrupted by 1, 2 or 3 oxygen atoms or by 1 or 2

groups with $R_{18}$ being as defined above, and $R_{20}$ is a group

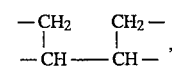

and, when m is 2, $R_1$ is $C_2$–$C_8$alkylene, $C_4$–$C_{10}$alkylene interrupted by 1, 2 or 3 oxygen atoms; cyclohexylenedimethylene, methylenedicyclohexylene, xylylene, a group

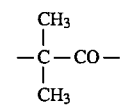

or aliphatic $C_2$–$C_{12}$diacyl, cycloaliphatic $C_8$–$C_{12}$diacyl, aromatic $C_8$–$C_{12}$diacyl, arylaliphatic $C_{10}$–$C_{22}$diacyl or heterocyclic $C_6$–$C_{16}$diacyl, and, when m is 3, $R_1$ is aliphatic $C_5$–$C_{14}$triacyl or aromatic $C_9$–$C_{10}$triacyl, and, when m is 4, $R_1$ is aliphatic $C_8$–$C_{12}$tetraacyl or aromatic $C_{10}$–$C_{12}$tetraacyl; $R_2$ is methyl, methoxy, ethoxy or OH, n is a number from 5 to 40, p is a number from zero to 20, $R_3$ is OH, methoxy, ethoxy or a group $(CH_3)_3SiO$—, $R_4$ is hydrogen, methyl, ethyl or a group $(CH_3)_3Si$—, and, when n+p is a number from 3 to 10, $R_3$ and $R_4$ also form a direct bond, $R_5$ is one of the groups of the formulae (Xa)–(Xc) in which $R_{22}$ is hydrogen or $C_1$–$C_{12}$alkyl, $R_{23}$ and $R_{24}$ which can be identical or different are $C_1$–$C_{10}$alkyl or $R_{23}$ and $R_{24}$, together with the carbon atom to which they are linked, are a $C_6$–$C_{12}$cycloalkylidene group, $R_{25}$ is $C_4$–$C_{18}$alkyl, $R_{26}$ is hydrogen or $C_1$–$C_{12}$alkyl and $R_{27}$ is one of the groups of the formulae (XIa)–(XIf), and, $R_6$ is a group of the formula (XIIa) or (XIIb) in which $R_{28}$ is $C_2$–$C_8$alkylene and $R_{29}$ is as defined above for $R_7$; and B) one or more compounds of the formulae (XIIIa)–(XIIIc) in which $A_1$ is $C_1$–$C_{10}$alkyl, cyclohexyl which is unsubstituted or mono-, di- or tri-substituted by C₁–C₄alkyl; phenyl which is unsubstituted or mono-, di- or tri-substituted by C₁–C₄alkyl or C₁–C₄alkoxy; benzyl or a group —A₁₃COOA₁₄ where A₁₃ is C₁—C₄alkylene and A₁₄ is C₄–C₁₈ alkyl, cyclohexyl which is unsubstituted or mono-, di- or tri-substituted by C₁–C₄alkyl; or benzyl, A₃, A₄, A₅ and A₆ which can be identical or different are hydrogen or methyl, s is 1 or 2, and, when s is 1, A₂ is hydrogen, C₁–C₁₆alkyl, allyl, benzyl or a group —A₁₃—COOA₁₄ as defined above, and, when A₂ is hydrogen, A₁ can also be a group of the formula (XIV) where A₁₅ is C₂–C₈alkylene, cyclohexylenedimethylene or isopropylidenedicyclohexylene, and, when s is 2, A₂ is C₂–C₈alkylene or xylylene, A₇ is phenyl which is unsubstituted or mono-, di- or tri-substituted by C₁–C₄alkyl or C₁–C₄alkoxy; A₈ is hydrogen, C₁–C₈alkyl, allyl or benzyl, t is 1, 2, 3 or 4, and, when t is 1, A₉ is aliphatic C₄–C₂₂acyl, cycloaliphatic C₇–C₁₂acyl, aromatic C₇–C₁₂acyl or arylaliphatic C₈–C₁₈acyl or one of the groups of the formulae (XVa)–(XVc) in which A₁₆ is as defined above for A₁₄; A₁₇ and A₁₈ which can be identical or different are hydrogen, C₁–C₁₀alkyl, cyclohexyl which is unsubstituted or mono-, di- or tri-substituted by C₁–C₄alkyl; benzyl or phenyl, or the group

is 4-morpholinyl, and X₂ and X₃ which can be identical or different are a group —OA₁₉ or

where A₁₉, A₂₀ and A₂₁ which can be identical or different are as defined above for A₁₇ and A₁₈, and, when t is 2, A₉ is aliphatic C₂–C₁₂diacyl, cycloaliphatic C₈–C₁₂diacyl, aromatic C₈–C₁₂diacyl or arylaliphatic C₁₀–C₂₂diacyl or a group of the formulae (XVIa)–(XVIc) in which A₂₂ is C₂–C₈alkylene, cyclohexylenedimethylene, isopropylidenedicyclohexylene or isopropylidenediphenylene, A₂₃ is as defined above for R₂₁ and X₄ is as defined above for X₂ and X₃, and, when t is 3, A₉ is aliphatic C₅–C₁₄triacyl or aromatic C₉–C₁₀triacyl or is 1,3,5-triazine-2,4,6 -triyl, and, when t is 4, A₉ is aliphatic C₈–C₁₂tetraacyl or aromatic C₁₀–C₁₂tetraacyl, A₁₀ is C₁–C₁₀alkyl, cyclohexyl which is unsubstituted or mono-, di- or tri-substituted by C₁–C₄alkyl; allyl, phenyl which is unsubstituted or mono-, di- or tri-substituted by C₁–C₄alkyl or C₁–C₄alkoxy; or benzyl, A₁₁ is as defined above for A₈, u is 1, 2 or 3, and, when u is 1, A₁₂ is as defined for A₁₀ or is a group

where A₂₄ and A₂₅ which can be identical or different are as defined for A₁₀, or A₂₄ is also hydrogen or aliphatic C₄–C₂₂acyl, cycloaliphatic C₇–C₁₂acyl, aromatic C₇–C₁₂acyl or arylaliphatic C₈– C₁₈acyl or a group —COOA₂₆ with A₂₆ being as defined above for A₁₄, and, when u is 2, A₁₂ is as defined above for R₂₁ or is a group of the formula (XVIIa) or (XVIIb) in which A₂₇ is as defined for A₁₀; A₂₈ is aliphatic C₂–C₁₂diacyl, cycloaliphatic C₈–C₁₂diacyl, aromatic C₈–C₁₂diacyl or arylaliphatic C₁₀–C₂₂diacyl and A₂₉ is as defined above for A₁₅, and, when u is 3, A₁₂ is a group of the formula (XVIII) in which v is 6.

5. A stabiliser composition according to claim 1, comprising:
A) one or more compounds of the formulae (IIa)–(IId) in which R is hydrogen, methyl or acetyl, X is —O— or

where R₇ is hydrogen, C₁–C₈alkyl, cyclohexyl, 2,2,6,6-tetramethyl-4-piperidyl, 1,2,2,6,6-pentamethyl-4-piperidyl or 1-acetyl-2,2,6,6-tetramethyl-4-piperidyl, m is 1, 2, 3 or 4, and, when m is 1, R₁ is aliphatic C₈–C₂₂acyl, cycloaliphatic C₇–C₁₁acyl, aromatic C₇–C₁₁acyl or arylaliphatic C₈– C₁₇acyl and, when X is —O—, R₁ is also a group of the formula (IV) in which X₁ is a group —OR₉ or

where R₉, R₁₀ and R₁₁ which are identical or different are as defined above for R₇ or the group

is 4-morpholinyl, or X₁ is also a group of the formula (V) where R₁₂ is 2,2,6,6-tetramethyl-4-piperidyl, 1,2,2,6,6-pentamethyl-4-piperidyl or 1-acetyl-2,2,6,6-tetramethyl-4-piperidyl and R₁₃ is C₂–C₆alkylene or C₆–C₁₀alkylene interrupted by 2 or 3 oxygen atoms or by 1 or 2

groups where R₁₄ is a group of the formula (VI) or the group —X—R₁ is also one of the groups of the formulae (VIIIa)–(VIIIe) in which R₁₅ is C₈–C₁₈alkyl, R₁₆ is C₁–C₈alkyl, cyclohexyl or a group of the formula (IX) in which R₂₁ is C₄–C₉alkylene, cyclohexylenedimethylene, methylenedicyclohexylene, a group

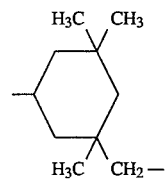

methylphenylene or methylenediphenylene, R₁₇ is methylene, carbonyl, oxalyl or ethylene, R₁₈ is acetyl, methoxycarbonyl or ethoxycarbonyl, R₁₉ is $C_2$–$C_6$alkylene or $C_6$–$C_{10}$alkylene interrupted by 2 or 3 oxygen atoms or by 1 or 2

groups with $R_{18}$ being as defined above and $R_{20}$ is a group

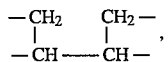

and, when m is 2, $R_1$ is $C_2$–$C_6$alkylene, xylylene, a group —$CH_2CO$— or

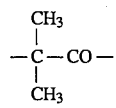

or aliphatic $C_2$–$C_{10}$diacyl, cycloaliphatic $C_8$–$C_{10}$diacyl, aromatic $C_8$–$C_{10}$diacyl, arylaliphatic $C_{10}$–$C_{22}$diacyl or heterocyclic $C_{10}$–$C_{15}$diacyl, and, when m is 3, $R_1$ is aliphatic $C_5$–$C_8$triacyl, and, when m is 4, $R_1$ is aliphatic $C_8$–$C_{10}$tetraacyl, $R_2$ is methyl or OH, n is a number from 5 to 35, p is a number from zero to 15, $R_3$ is OH or a group $(CH_3)_3SiO$—, $R_4$ is hydrogen or a group $(CH_3)_3Si$—, $R_5$ is one of the groups of the formulae (Xa)–(Xc) in which $R_{22}$ is hydrogen or $C_1$–$C_8$alkyl, $R_{23}$ and $R_{24}$, together with the carbon atom to which they are linked, are a $C_6$–$C_{12}$cycloalkylidene group, $R_{25}$ is $C_8$–$C_{18}$alkyl, $R_{26}$ is hydrogen or $C_1$–$C_8$alkyl and $R_{27}$ is one of the groups of the formulae (XIa)–(XId), and $R_6$ is a group of the formula (XIIa) where $R_{28}$ is $C_2$–$C_6$alkylene; and B) one or more compounds of the formula (XIIIa)–(XIIIc) in which $A_1$ is $C_1$–$C_8$alkyl, cyclohexyl, phenyl, benzyl or a group —$A_{13}$—$COOA_{14}$ where $A_{13}$ is $C_1$–$C_4$alkylene and $A_{14}$ is $C_8$–$C_{18}$alkyl, $A_3$, $A_4$, $A_5$ and $A_6$ are hydrogen, s is 1 or 2, and, when s is 1, $A_2$ is hydrogen, $C_1$–$C_{14}$alkyl, benzyl or a group —$A_{13}$—$COOA_{14}$ as defined above and, when $A_2$ is hydrogen, $A_1$ can also be a group of the formula (XIV) with $A_{15}$ being $C_2$–$C_6$alkylene, and when s is 2, $A_2$ is $C_2$–$C_6$alkylene or xylylene, $A_7$ is phenyl, $A_8$ is hydrogen, $C_1$–$C_4$ alkyl or benzyl, t is 1, 2 or 3 and, when t is 1, $A_9$ is aliphatic $C_8$–$C_{22}$acyl, cycloaliphatic $C_7$–$C_{11}$acyl, aromatic $C_7$–$C_{11}$acyl or arylaliphatic $C_8$–$C_{17}$acyl or a group of the formula (XVa) or (XVb) in which $A_{16}$ is $C_8$–$C_{18}$alkyl, cyclohexyl or t-butylcyclohexyl, $A_{17}$ is hydrogen, $A_{18}$ is $C_1$–$C_8$alkyl, cyclohexyl or benzyl, and, when t is 2, $A_9$ is aliphatic $C_2$–$C_{10}$diacyl, cycloaliphatic $C_8$–$C_{10}$diacyl, aromatic $C_8$–$C_{10}$diacyl or arylaliphatic $C_{10}$–$C_{22}$diacyl or a group of the formula (XVIa) or (XVIb) in which $A_{22}$ is $C_4$–$C_8$alkylene, cyclohexylenedimethylene or isopropylidenedicyclohexylene and $A_{23}$ is as defined above for $R_{21}$ and, when t is 3, $A_9$ is aliphatic $C_5$–$C_8$triacyl or benzenetricarbonyl, $A_{10}$ is $C_1$–$C_8$alkyl, cyclohexyl, phenyl or benzyl, $A_{11}$ is as defined above for $A_8$, u is 1 or 2 and, when u is 1, $A_{12}$ is as defined for $A_{10}$ or is a group

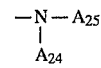

where $A_{24}$ is hydrogen and $A_{25}$ is as defined above for $A_{10}$, and, when u is 2, $A_{12}$ is as defined above for $R_{21}$.

6. A stabiliser composition according to claim 1, comprising:

A) one or more compounds of the formulae (IIa)–(IId) in which R is hydrogen or methyl, X is —O—, m is 1, 2, 3 or 4, and, when m is 1, $R_1$ is aliphatic $C_{12}$–$C_{22}$acyl or benzoyl or a group of the formula (IV) in which $X_1$ is a group

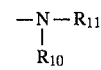

where $R_{10}$ and $R_{11}$ which can be identical or different are $C_1$–$C_4$alkyl, cyclohexyl, 2,2,6,6-tetramethyl-4-piperidyl or 1,2,2,6,6-pentamethyl-4-piperidyl or $R_{10}$ is also hydrogen, or $X_1$ is also a group of the formula (V) where $R_{12,2}$ is 2,2,6,6-tetramethyl-4-piperidyl or 1,2,2,6,6-pentamethyl-4-piperidyl and $R_{13}$ is a group —$(CH_2)_{2-6}$—, or the group —$X$—$R_1$ is also one of the groups of the formulae (VIIIa)–(VIIId) in which $R_{15}$ is $C_{12}$–$C_{18}$alkyl, $R_{16}$ is a group of the formula (IX) where $R_{21}$ is $C_6$–$C_9$alkylene, methylenedicyclohexylene or a group

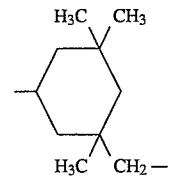

$R_{17}$ is carbonyl, $R_{18}$ is methoxycarbonyl or ethoxycarbonyl and $R_{19}$ is a group —$(CH_2)_{2-6}$—, and, when m is 2, $R_1$ is one of the groups

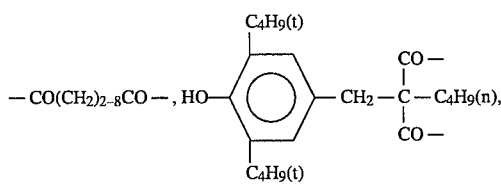

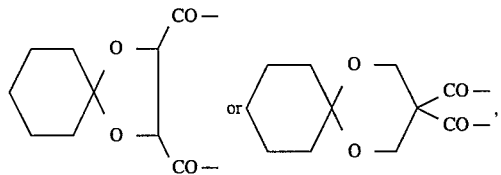

and, when m is 3, $R_1$ is triacyl derived from citric acid or nitrilotriacetic acid, and, when m is 4, $R_1$ is 1,2,3,4-butanetetracarbonyl, $R_2$ is methyl, n is a number from 5 to 30, p is zero, $R_3$ is OH, $R_4$ is hydrogen, $R_5$ is a group of the formula (Xa) or (Xb) in which $R_{22}$ is hydrogen or methyl, $R_{23}$ and $R_{24}$, together with a carbon atom to which they are linked, are a cyclododecylidene group, $R_{25}$ is $C_{12}$–$C_{18}$alkyl and $R_{26}$ is hydrogen or methyl, and $R_6$ is a group of the formula (XIIa) in which $R_{28}$ is ethylene; and B) one or more compounds of the formulae (XIIIa)–(XIIIc) in which $A_1$ is phenyl or a group

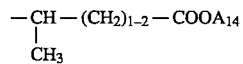

with $A_{14}$ being $C_{12}$–$C_{18}$alkyl, $A_3$, $A_4$, $A_5$ and $A_6$ are hydrogen, s is 1 or 2 and, when s is 1, $A_2$ is hydrogen, $C_1$–$C_{12}$alkyl or benzyl, and, when s is 2, $A_2$ is xylylene, $A_7$ is phenyl, $A_8$ is hydrogen or methyl, t is 1 or 2 and, when t is 1, $A_9$ is aliphatic $C_{10}$–$C_{22}$acyl, benzoyl or a group of the formula (XVa) or (XVb) in which $A_{16}$ is $C_{12}$–$C_{18}$alkyl, $A_{17}$ is hydrogen, $A_{18}$ is $C_1$–$C_4$alkyl or cyclohexyl, and, when t is 2, $A_9$ is a group —CO—$(CH_2)_{2-8}$CO— or a group of the formula (XVIa) or (XVIb) in which $A_{22}$ is $C_4$–$C_6$alkylene and $A_{23}$ is as defined above for $R_{21}$; $A_{10}$ is $C_1$–$C_4$alkyl or phenyl, $A_{11}$ is hydrogen or methyl, u is 1 or 2 and, when u is 1, $A_{12}$ is $C_1$–$C_4$alkyl, phenyl or cyclohexyl and, when u is 2, $A_{12}$ is as defined above for $R_{21}$.

7. A stabiliser composition according to claim 1, comprising:

A) one or more compounds of the formulae:

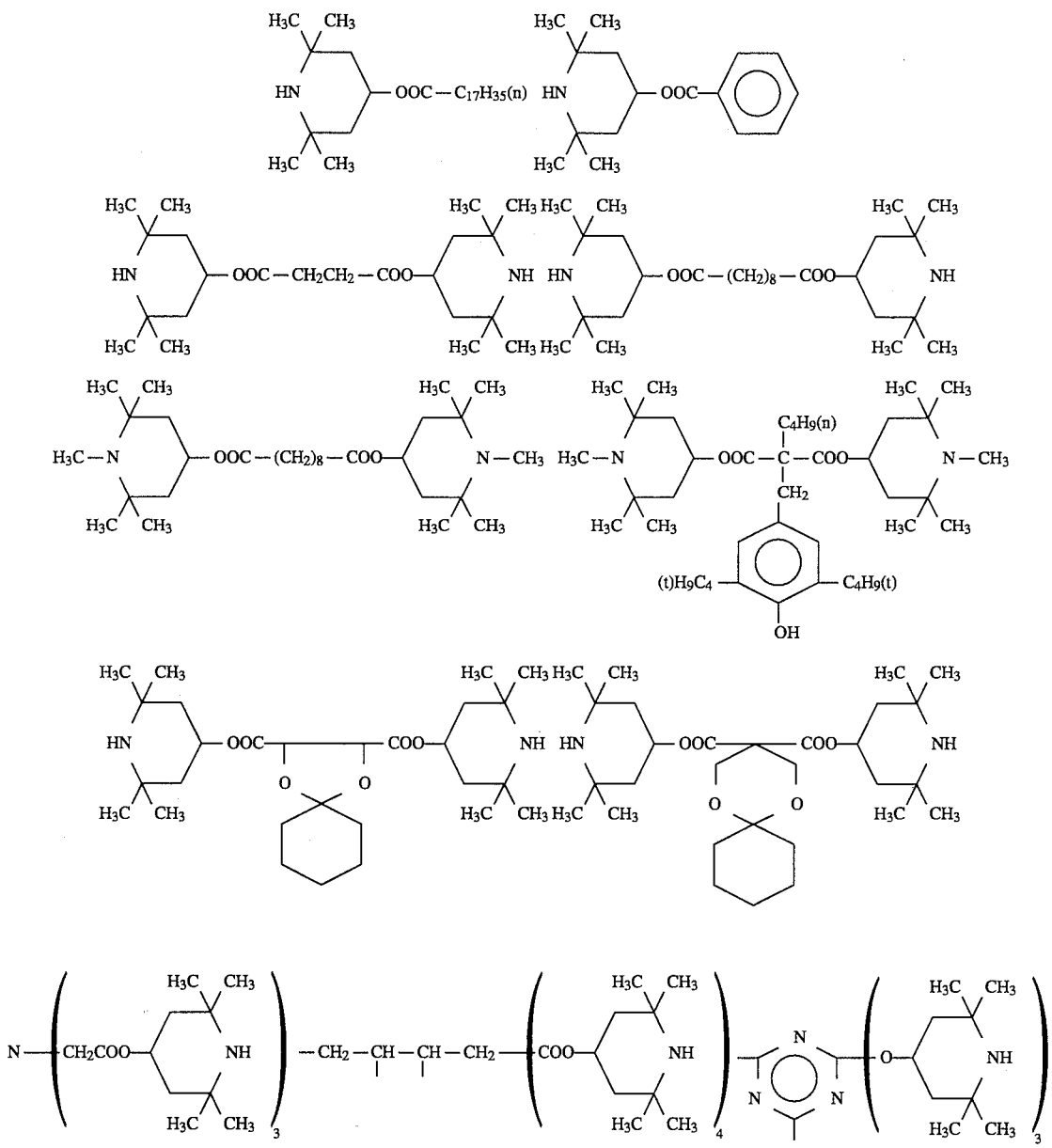

-continued
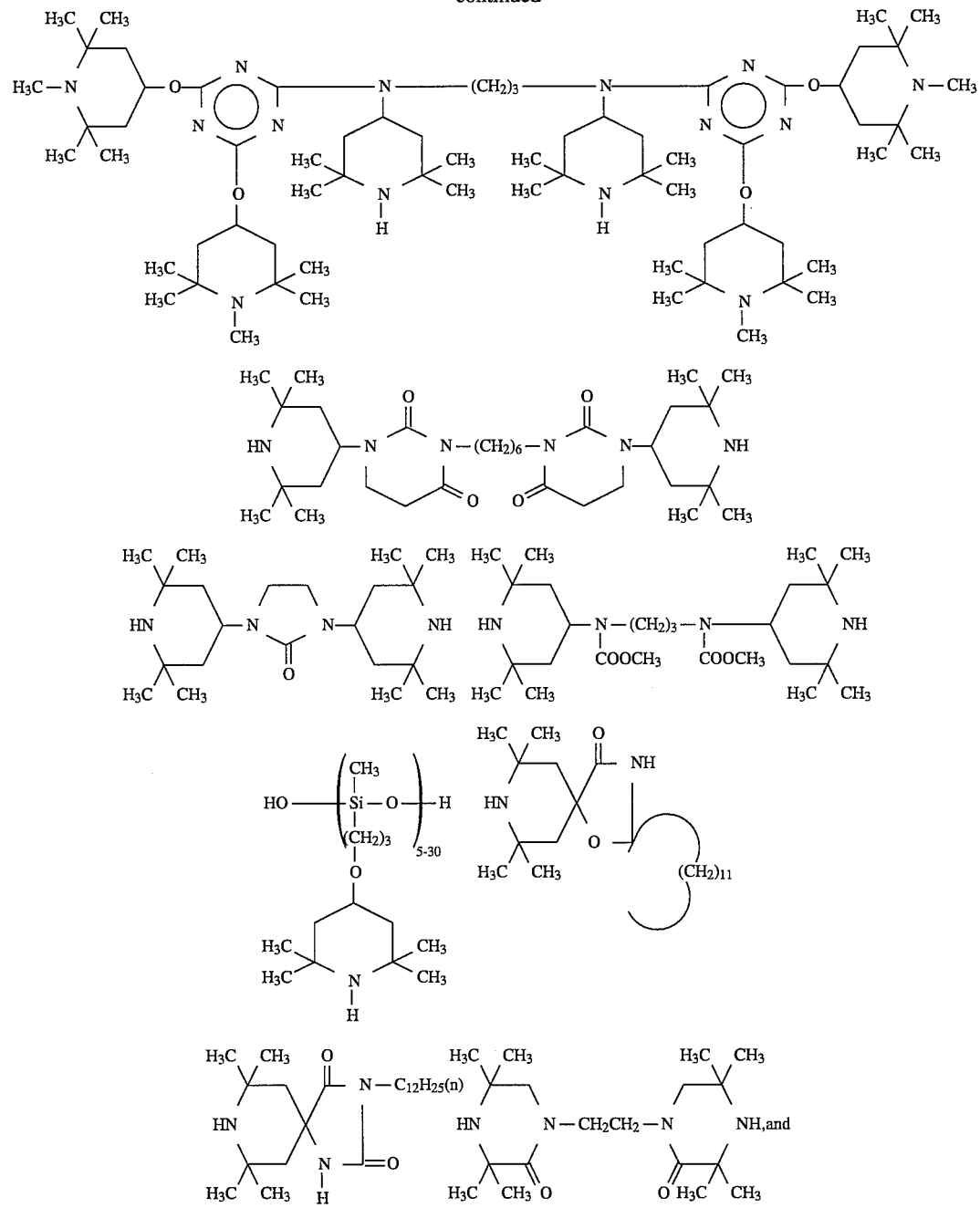
B) one or more compounds of the formulae:
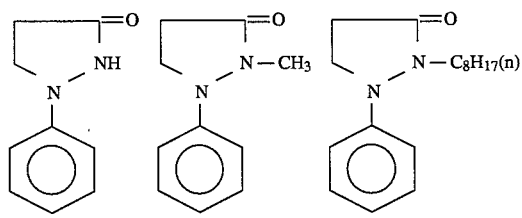

-continued
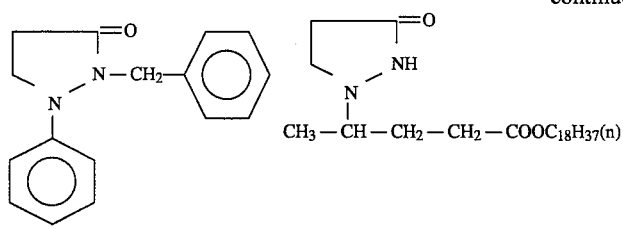
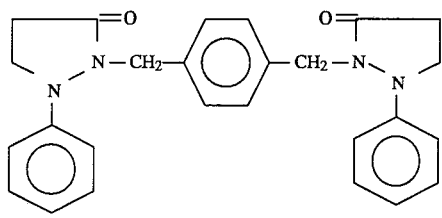
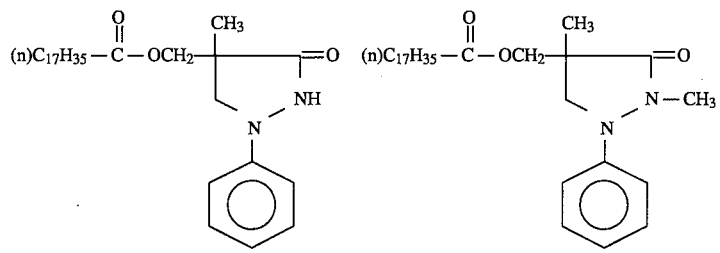
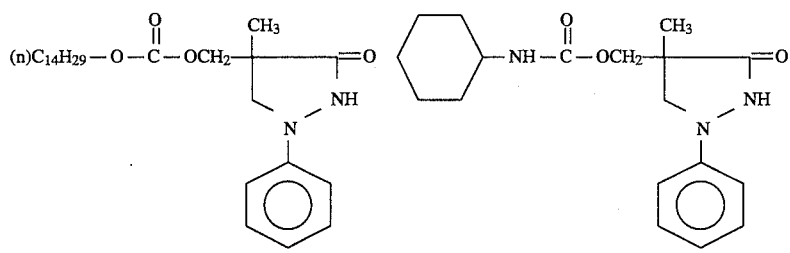
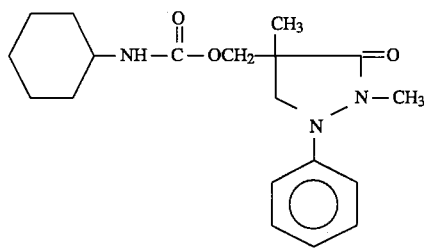
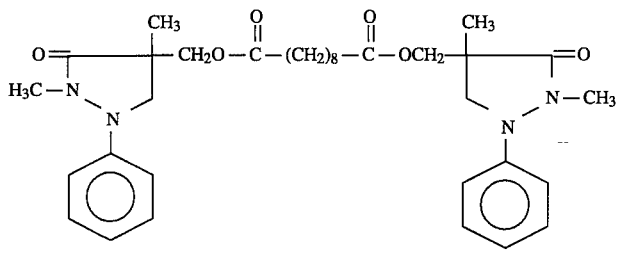

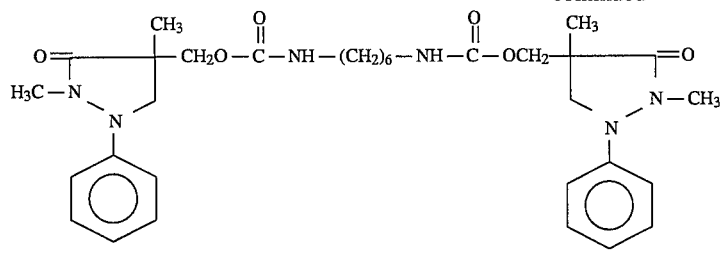

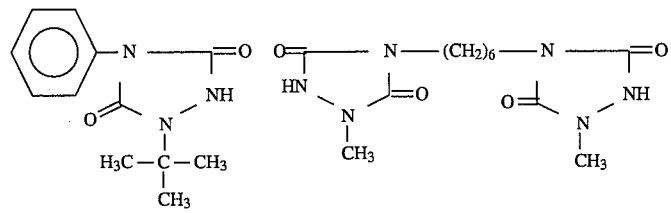

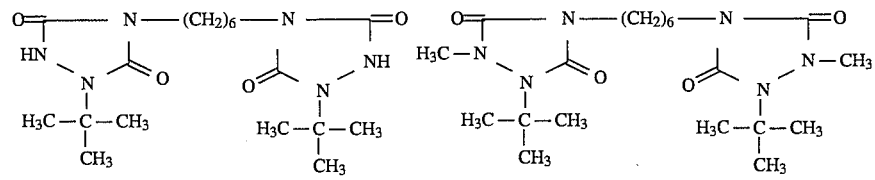

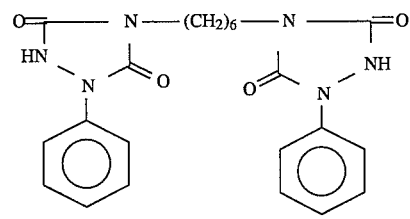

8. A stabiliser composition according to claim 1, comprising:

A) one or more compounds of the formula (IIa) in which R is hydrogen or methyl, X is —O—, m is 1 or 2 and, when m is 1, —X—$R_1$ is a group of the formula (VIIId) in which R is as defined above, $R_{18}$ is ($C_1$–$C_8$alkoxy)carbonyl and $R_{19}$ is $C_2$–$C_{12}$alkylene and, when m is 2, $R_1$ is a group —CO—$(CH_2)_{2-8}$—CO—; and B) one or more compounds of the formula (XIIIa), (XIIIb) or (XIIIc) in which s is 1, $A_1$ is phenyl, $A_2$, $A_3$, $A_4$, $A_5$ and $A_6$ are hydrogen, t is 1, $A_7$ is phenyl, $A_8$ is hydrogen or methyl, $A_9$ is aliphatic $C_{10}$–$C_{22}$acyl, u is 2, $A_{10}$ is $C_1$–$C_4$alkyl, $A_{11}$ is hydrogen or methyl and $A_{12}$ is $C_6$–$C_9$alkylene.

9. A stabiliser composition according to claim 1, comprising:

A) one or more compounds of the formula (IIa) in which R is hydrogen or methyl, X is —O—, m is 2 and $R_1$ is a group —CO—$(CH_2)_{2-8}$—CO—; and B) one or more compounds of the formula (XIIIb) or (XIIIc) in which t is 1, $A_7$ is phenyl, $A_8$ is hydrogen or methyl, $A_9$ is aliphatic $C_{10}$–$C_{22}$acyl, u is 2, $A_{10}$ is $C_1$–$C_4$ alkyl, $A_{11}$ is hydrogen or methyl and $A_{12}$ is $C_6$–$C_9$alkylene.

10. A composition comprising an organic material susceptible to degradation induced by light, heat or oxidation and 0.025 to 2% by weight, relative to the weight of the organic material, of the component A) as defined in claim 1 and 0.001 to 1% by weight, relative to the weight of the organic material, of the component B) as defined in claim 1.

11. A composition according to claim 10, wherein the organic material is a synthetic polymer.

12. A composition according to claim 10, wherein the organic material is a polyolefin.

13. A composition according to claim 10, wherein the organic material is polyethylene or polypropylene.

14. A method for stabilising an organic material against degradation induced by light, heat or oxidation, which comprises incorporating into said material an effective amount of a stabiliser composition as defined in claim 1.

* * * * *